(12) United States Patent
Park et al.

(10) Patent No.: US 10,472,276 B2
(45) Date of Patent: Nov. 12, 2019

(54) COMPOSITION FOR FORMING FILM HAVING WRINKLE STRUCTURE AND METHOD OF FORMING THE FILM

(71) Applicant: ELECTRONICS AND TELECOMMUNICATIONS RESEARCH INSTITUTE, Daejeon (KR)

(72) Inventors: Seung Koo Park, Daejeon (KR); Jaehyun Moon, Daejeon (KR); Jeong Ik Lee, Daejeon (KR); Byoung Gon Yu, Chungcheongbuk-do (KR); Jonghee Lee, Daejeon (KR); Chul Woong Joo, Seoul (KR); Doo-Hee Cho, Daejeon (KR); Jun-Han Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 671 days.

(21) Appl. No.: 14/822,417

(22) Filed: Aug. 10, 2015

(65) Prior Publication Data
US 2016/0159686 A1    Jun. 9, 2016

(30) Foreign Application Priority Data

Dec. 4, 2014 (KR) .................... 10-2014-0172626
Jun. 18, 2015 (KR) .................... 10-2015-0086837

(51) Int. Cl.
*C03C 17/32* (2006.01)
*C03C 17/34* (2006.01)
*C09D 5/28* (2006.01)

(52) U.S. Cl.
CPC .......... *C03C 17/32* (2013.01); *C03C 17/3405* (2013.01); *C09D 5/28* (2013.01);
(Continued)

(58) Field of Classification Search
CPC . C03C 17/32; C03C 17/3405; C03C 2217/77; C03C 2218/116; C03C 2218/32; C09D 5/00; C09D 5/28
(Continued)

(56) References Cited

U.S. PATENT DOCUMENTS

| | | |
|---|---|---|
| 2013/0149803 A1 | 6/2013 | Moon et al. |
| 2014/0017454 A1 | 1/2014 | Boyce et al. |
| 2014/0029267 A1 | 1/2014 | Moon et al. |

FOREIGN PATENT DOCUMENTS

| | | |
|---|---|---|
| KR | 10-2009-0088240 A | 8/2009 |
| KR | 10-2014-0016125 A | 2/2014 |

OTHER PUBLICATIONS

Yu-Cheng Chen et al., "High Aspect Ratio Wrinkles via Substrate Prestretch", Advanced Materials, 2014, pp. 5626-5631, vol. 26.
(Continued)

*Primary Examiner* — Robert S Walters, Jr.

(57) ABSTRACT

A composition for forming film having wrinkle structure and a method of forming the film are disclosed. The composition includes photo-curable agent and photoinitiator dissolved in the photo-curable agent. The cut off wavelength of light transmittance of the photo-curable agent is greater than the cut off wavelength of light absorbance of the photoinitiator. Photo-cured thin film is formed at the upper portion of composition layer at an initial time period of irradiation. By subsequent contraction, the photo-cured thin film forms wrinkles. The wrinkle structure is controlled by the relation of the cut off wavelength of light transmittance of the photo-curable agent and the cut off wavelength of light absorbance of the photoinitiator, the photo-curing rate of the composition and the thickness of the composition layer, and the photoinitiator concentration, etc., before photo-curing.
(Continued)

The film may increase the emission efficiency of LED and OLED and the sensing effect of sensor.

11 Claims, 10 Drawing Sheets

(52) U.S. Cl.
CPC .... *C03C 2217/77* (2013.01); *C03C 2218/116* (2013.01); *C03C 2218/32* (2013.01)

(58) Field of Classification Search
USPC .......................................................... 427/257
See application file for complete search history.

(56) References Cited

OTHER PUBLICATIONS

F. Greco et al., "Micro-wrinkled palladium surface for hydrogen sensing and switched detection of lower flammability limit", International Journal of Hydrogen Energy, 2012, pp. 17529-17539, vol. 37.

Yongfeng Mei et al., "Principles and applications of micro and nanoscale wrinkles", Materials Science and Engineering R, 2010, pp. 209-224, vol. 70.

Ned Bowden et al., "Spontaneous formation of ordered structures in thin Films of metals supported on an elastomeric polymer", Nature, May 14, 1998, pp. 146-149, vol. 393.

Jin-Wook Shin et al., "Random nano-structures as light extraction functionals for organic light-emitting diode applications", Organic Electronics, 2014, pp. 196-202, vol. 15.

E. Cerda et al., "Geometry and Physics of Wrinkling", Physical Review Letters, Feb. 21, 2003, pp. 074302-1-074302-4, vol. 90, No. 7.

Soumendra K. Basu et al., "Mechanism of wrinkle formation in curing coatings", Progress in Organic Coationgs, 2005, pp. 1-16, vol. 53.

Ewa Andrzejewska, "Photopolymerization kinetics of multifunctional monomers", Progress in Polymer Science, 2001, pp. 605-665, vol. 26.

COMPOSITION FOR FORMING FILM HAVING WRINKLE STRUCTURE AND METHOD OF FORMING THE FILM

CROSS-REFERENCE TO RELATED APPLICATIONS

This U.S. non-provisional patent application claims priority under 35 U.S.C. § 119 of Korean Patent Application Nos. 10-2014-0172626, filed on Dec. 4, 2014, and 10-2015-0086837, filed on Jun. 18, 2015, the entire contents of which are hereby incorporated by reference.

BACKGROUND OF THE INVENTION

The present invention disclosed herein relates to a composition for forming a film having a wrinkle structure and a method of forming the film having the wrinkle structure.

Wrinkles are a common phenomenon in nature. A wrinkle structure may be generated at the skin layer during releasing the stress of the skin layer occurring when the double layer of a hard and thin skin layer and a soft and thick foundation layer contract. Here, the thick layer may act as a contractor of the double layer. For example, the skin of an apple may be considered as the skin layer, and the flesh of the apple may be considered as the foundation layer. When an apple is dried, the flesh may contract, and wrinkles may be formed at the skin of the apple.

Meanwhile, the size of the wrinkle structure of a film and the control thereof are significant technique in an organic light emitting diode (OLED). For the light extraction of the OLED, the period of wrinkle and the depth of wrinkle from about several micrometers to about several hundreds of nanometers are required. In addition, since the surface area increases depending on the wrinkle structure, the control of the wrinkle structure as a material for a sensor is significant. Wrinkle occurs due to a significant difference of elastic moduli between the skin layer and the thick layer. For example, the wrinkled film is produced in several tens of nanometers of metal layer on a thermally extended polydimethylsiloxane (PDMS).

Meanwhile, the inventors of the present invention have studied on a compound (prepolymer) for forming a film having a randomly ordered wrinkle structure (Korean Laid-open Patent Publication No. 10-2014-0016125). However, only curable compounds have been disclosed for forming a wrinkled film in previous studies, and the combination of the compounds with an appropriate photoinitiator and the principle on effective formation of a film with a wrinkle structure using the combination have not been disclosed. Further, various factors concerning the formation of a film with a wrinkle structure and the control of the size of the wrinkle structure (control of components of a solution, concentration of a vinyl group of a photo-curable agent and a photoinitiator, photo-curing rate, light intensity, and the thickness of a coated layer, etc.) have not been disclosed, either.

SUMMARY OF THE INVENTION

The present invention provides a composition for forming a film having a wrinkle structure spontaneously only by ultraviolet (UV) irradiation.

The present invention also provides a method of forming a film having a wrinkle structure using the composition.

Embodiments of the present invention provide compositions for forming a film having a wrinkle structure including a first photo-curable agent and a first photoinitiator dissolved in the first photo-curable agent. In this case, a first cut off wavelength of light transmittance of the first photo-curable agent is equal to or is greater than a first cut off wavelength of light absorbance of the first photoinitiator, the first cut off wavelength of light transmittance is the longest light wavelength of wavelengths having less than or equal to about 1.0% of light transmittance when light is irradiated to the first photo-curable agent with a thickness of about 1 mm, and the first cut off wavelength of light absorbance is the shortest light wavelength of wavelengths having less than or equal to about 0.05 of light absorbance when light is irradiated to a diluted solution layer, 10 mm in thickness, of the first photoinitiator with $1.0 \times 10^{-4}$ mol %.

In some embodiments, the first cut off wavelength of light transmittance of the first photo-curable agent and the first cut off wavelength of light absorbance of the first photoinitiator may be from about 250 nm to about 350 nm.

In other embodiments, the first photo-curable agent may have a liquid phase with a viscosity from about 1 cP to about $10^7$ cP at 25° C.

In still other embodiments, a concentration of the first photoinitiator may be from about 0.01 wt % to about 10 wt % with respect to a total amount of the composition.

In even other embodiments, the first photo-curable agent may include at least two substituted or unsubstituted styrene groups in a molecule thereof.

In yet other embodiments, the composition may further include a second photo-curable agent. In this case, the second photo-curable agent may have a second cut off wavelength of light transmittance smaller than the first cut off wavelength of light absorbance of the first photoinitiator, and an amount of the second photo-curable agent may be from about 1 wt % to about 70 wt % with respect to a total amount of photo-curable agents.

In further embodiments, the second photo-curable agent may include at least two substituted or unsubstituted acryl groups in a molecule thereof.

In yet other embodiments, the third photo-curable agent may have a solid phase irrespective of the cut off wavelength of light transmittance, and an amount of the third photo-curable agent may be from about 1 wt % to about 70 wt % with respect to a total amount of photo-curable agents.

In further embodiments, the third photo-curable agent may include at least two substituted or unsubstituted styrene or acryl groups in a molecule thereof.

In still further embodiments, the first photoinitiator may include at least one selected from the group consisting of Irgacure 184, Irgacure 651, Irgacure 754, Irgacure 2959, Darocur 1173, and Darocur MBF as a surface cure photoinitiator.

In even further embodiments, the composition may further include a second photoinitiator dissolved in the first photo-curable agent. In this case, the second photoinitiator may have a second cut off wavelength of light absorbance greater than the first cut off wavelength of light transmittance of the first photo-curable agent, and an amount of the second photoinitiator may be from about 0.1 wt % to about 50 wt % with respect to a total amount of photoinitiators.

In yet further embodiments, the second photoinitiator may include at least one selected from the group consisting of Darocur TPO, Irgacure 369, Irgacure 907, Irgacure 819, Irgacure 2100, Irgacure 784, Irgacure 250, Irgacure 184, Irgacure 651, Irgacure 754, Irgacure 2959, Darocur 1173, and Darocur MBF.

In much further embodiments, the composition may further include a solvent diluting the first photo-curable agent or dissolving the third photo-curable agent. The solvent may include at least one selected from the group consisting of cyclopentanone, cyclohexanone, γ-butyrolactone, toluene, methanol, ethanol, propanol, ethyl ether, N,N-dimethyl acetamide, N-methyl pyrrolidinone, tetrahydrofuran, ethyl acetate and hexane.

In other embodiments of the present invention, methods of forming a film include providing a composition layer on a substrate using a composition including a photo-curable agent and a photoinitiator dissolved in the photo-curable agent; and curing the composition layer to form a film having a randomly ordered wrinkle structure. In this case, the photoinitiator has a cut off wavelength of light absorbance less than or equal to about 310 nm. The cut off wavelength of light absorbance is the smallest light wavelength of wavelengths having light absorbance of less than or equal to about 0.05 when light is irradiated to a diluted solution of about $1.0 \times 10^{-4}$ mol % of the photoinitiator with a thickness of about 10 mm.

In some embodiments, the curing of the composition layer may include irradiating UV rays to the composition layer.

In other embodiments, an apparent first order photo-curing rate constant ($k_{app}$) during curing the composition layer may be from about 0.01 to about 5.0 sec$^{-1}$. For example, an apparent first order photo-curing rate constant ($k_{app}$) during curing the composition layer may be from about 0.08 to about 0.86 min$^{-1}$.

In still other embodiments, the method may further include controlling the thickness of the composition layer to from about 0.1 μm to about 1000 μm to control the size of the wrinkle structure.

In even other embodiments, a wavelength range of the UV rays may be from about 200 nm to about 500 nm.

In yet other embodiments, the irradiating of the UV rays may be conducted in an inert gas atmosphere or in vacuum for from about 1 to about 30 min.

In further embodiments, the photoinitiator may include at least one selected from the group consisting of Irgacure 184, Irgacure 651, Irgacure 754, Irgacure 2959, Darocur 1173 and Darocur MBF as a surface cure photoinitiator.

The composition according to the present invention may form a film having a wrinkle structure with several micrometer scale via the irradiation of UV rays to the composition based on the relationship between the wavelength of light transmittance of a photo-curable agent and the wavelength of light absorbance of a photoinitiator. In addition, the size of the wrinkle structure may be modulated by controlling the rate of photo-curing reaction of the photo-curable agent, the concentration of the photoinitiator, the light intensity, the concentration of the vinyl group of the photo-curable agent, and the thickness of a composition layer, and by using a mixture of a plurality of photo-curable agents and a mixture of a plurality of photoinitiators. Further, since the film formed by using the composition includes randomly ordered wrinkle structure, the film may be appropriately used as a light scattering film for a display or a light extraction film for an illumination.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
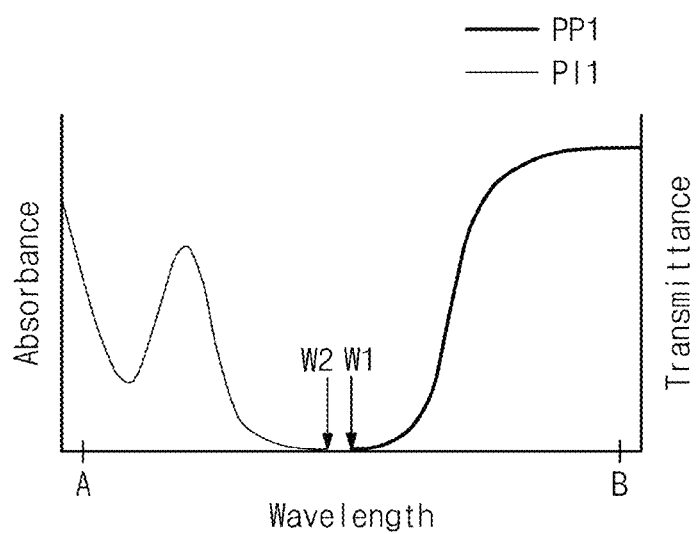
FIG. 1 is a graph showing the transmittance spectrum of a photo-curable agent and the absorbance spectrum of a photoinitiator according embodiments of the present invention.

The above objects, other objects, features and advantages of the inventive concept will be easily understood from preferred exemplary embodiments with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer (or film) is referred to as being 'on' another layer (or film) or substrate, it can be directly on the other layer (or film) or substrate, or intervening layers (or films) may also be present. In the drawings, the sizes and thicknesses of elements may be enlarged for clarity of the inventive concept. It will be understood that, although the terms first, second, third, etc. may be used herein to describe various regions and layers, these regions and layers should not be limited by these terms. These terms are only used to distinguish one region or layer from another region or layer. For example, a first layer discussed below could be termed a second element, and similarly, a second layer could be termed a first layer. Example embodiments embodied and described herein may include complementary example embodiments thereof. The expression 'and/or' is used to include at least one of exemplified elements illustrated thereabout. Like reference numerals refer to like elements throughout.

Hereinafter, the composition for forming a film having a wrinkle structure, a method of forming a film using the composition, and a method of manufacturing an organic electronic device according to the present invention will be described in detail referring to attached drawings.

Figure 2A:
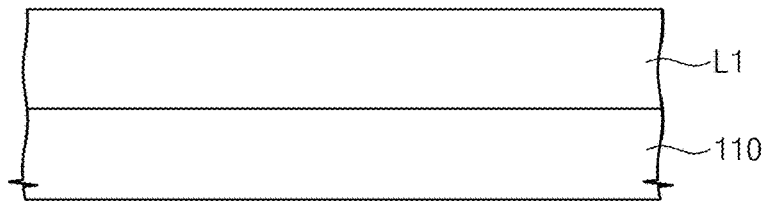
FIGS. 2A to 2C are cross-sectional views schematically illustrating a method of forming a film having a wrinkle structure according to an embodiment of the present invention.
Figure 2B:
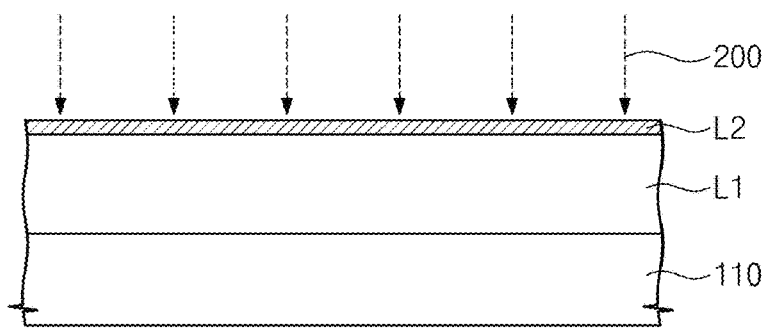
Figure 2C:
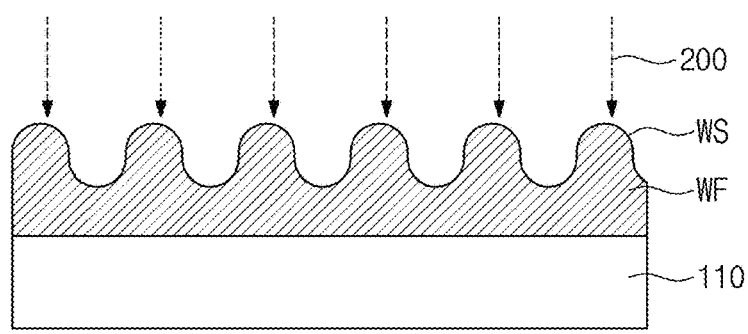

FIG. 1 is a graph showing the transmittance spectrum of a photo-curable agent and the absorbance spectrum of a photoinitiator according the embodiments of the present invention. FIGS. 2A to 2C are cross-sectional views schematically illustrating a method of forming a film having a wrinkle structure according to an embodiment of the present invention.

Referring to FIG. 1, a composition for forming a film having a wrinkle structure according to exemplary embodiments of the present invention may include a first photo-curable agent PP1 and a first photoinitiator PI1. The first photoinitiator PI1 may absorb irradiated lights and produce radicals. The radical may react with the photo-curable group (such as vinyl group) of the first photo-curable agent PP1 to photo-cure the first photo-curable agent PP1.

The first photo-curable agent PP1 is a prepolymer and may include at least two vinyl groups in a molecule. The first photo-curable agent PP1 may be a liquid phase at room temperature (about 25° C.). More particularly, the first photo-curable agent may have viscosity of from about 1 cP to about $10^7$ cP at 25° C.

The first photo-curable liquid PP1 may have a first cut off wavelength of light transmittance W1. The first cut off wavelength of light transmittance W1 may be the greatest light wavelength among light wavelengths having the transmittance of the first photo-curable agent PP1 of about 1.0% and less. The light transmittance may be obtained from the first photo-curable agent layer 1 mm in thickness. That is, as shown in FIG. 1, the first photo-curable agent PP1 may have high transmittance with respect to lights with long wavelengths B, however, may have gradually decreasing transmittance with respect to lights with short wavelengths, and the transmittance approaches to near 0%. In this case, the light wavelength at which the light transmittance of the first photo-curable agent PP1 reaches to about 1.0% may be the first cut off wavelength of light transmittance W1. For example, the light transmittance of the first photo-curable agent PP1 may be about 1.0% and less at the light wavelengths between A to W1. However, the cut off wavelength of light transmittance of the present invention may be defined as the greatest light wavelength W1 at which the transmittance becomes about 1.0% and less.

The first cut off wavelength of light transmittance W1 may range from about 270 nm to about 350 nm. Preferably, the first cut off wavelength of light transmittance W1 may be about 300 nm and above.

The first photo-curable agent PP1 may include a substituted or unsubstituted styrene group as a vinyl group. The first cut off wavelength of light transmittance W1 may be affected a lot by the vinyl group of the first photo-curable agent PP1. In the case that the vinyl group includes the styrene group, the first cut off wavelength of light transmittance W1 may be increased. That is, the first cut off wavelength of light transmittance W1 may be red-shifted on spectrum. More particularly, the first photo-curable agent PP1 may include a compound of the following Formula 1, or a compound of the following Formula 2 or a compound of the following Formula 3 or a compound of the following Formula 4.

[Formula 1]

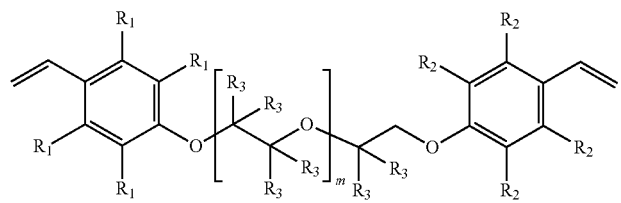

[Formula 2]

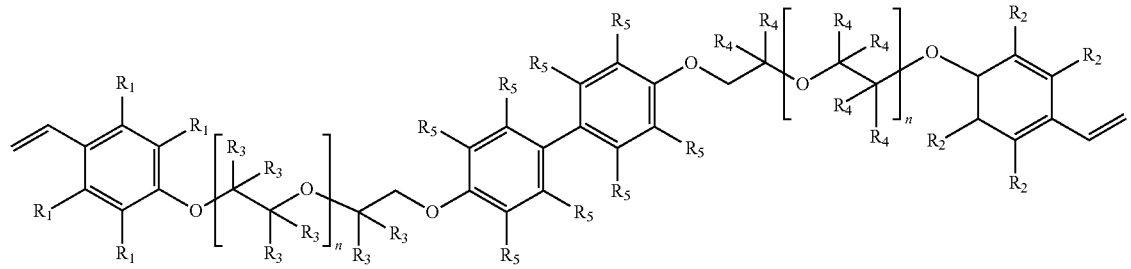

[Formula 3]

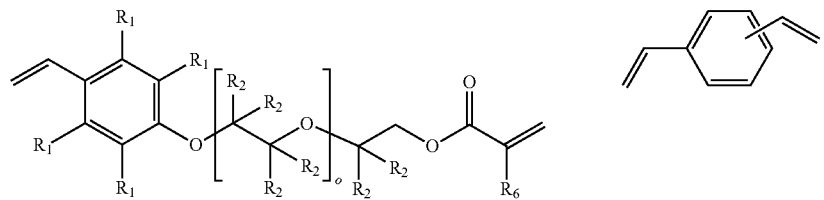

[Formula 4]

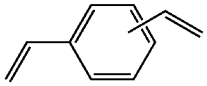

In the above Formula 1, Formula 2, and Formula 3, m may be an integer from 0 to 100, n may be an integer from 0 to 50, and o may be an integer from 0 to 100. $R_1$, $R_2$, $R_3$, $R_4$ and $R_5$ may be independently hydrogen or a halogen atom. $R_6$ may be independently hydrogen or a methyl group.

In an embodiment, the compound of the above Formula 1 may be at least one compound of the following Formulae 5 to 9.

[Formula 5]

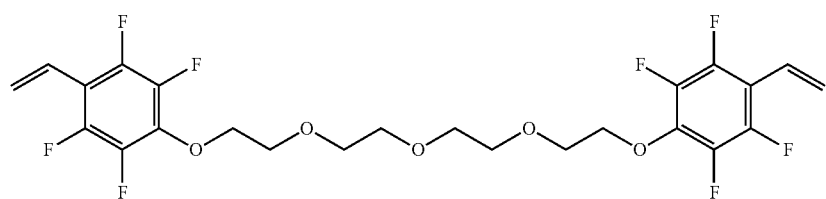

[Formula 6]

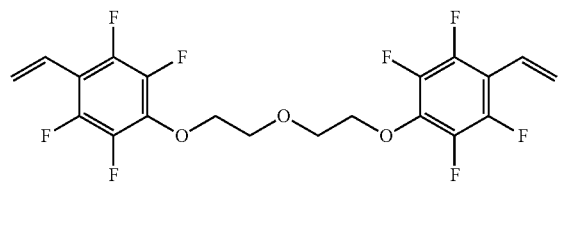

[Formula 7]

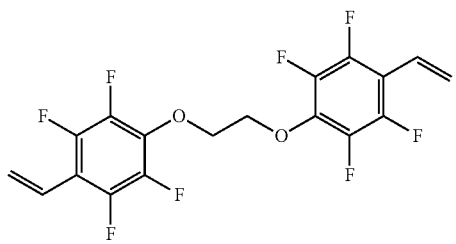

[Formula 8]

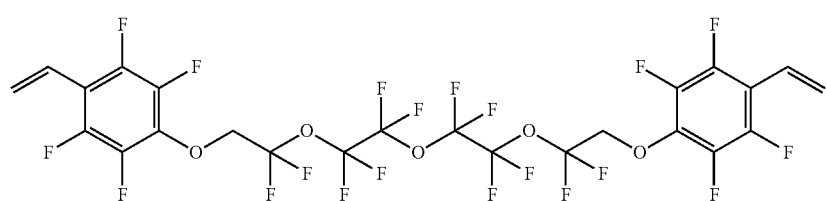

[Formula 9]

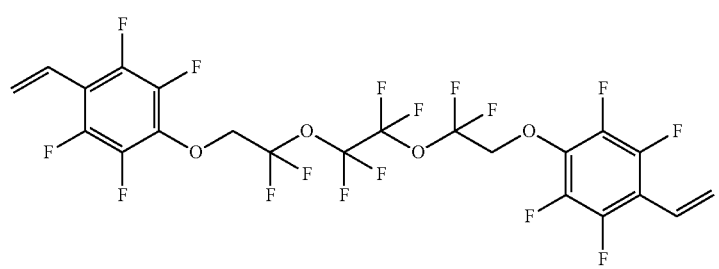

In an embodiment, the compound of the above Formula 2 may be a compound of the following Formula 10.

[Formula 10]

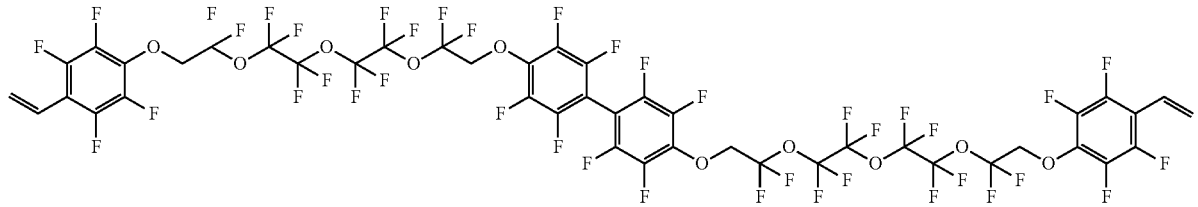

In an embodiment, the compound of the above Formula 3 may be a compound of the following Formula 11.

[Formula 11]

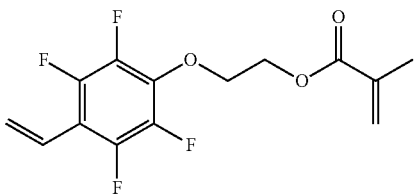

In an embodiment, the compound having more than 2 substituted or unsubstituted styrene groups may be the following Formula 12.

[Formula 12]

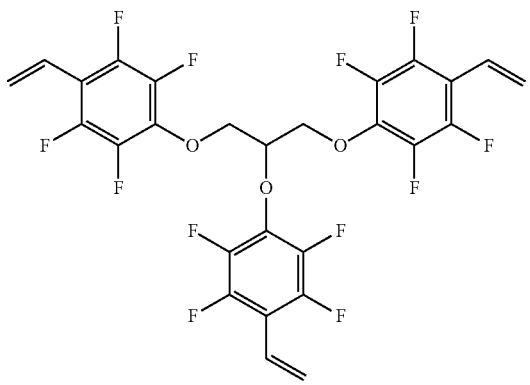

The composition according to exemplary embodiments of the present invention may further include a second photo-curable agent. The second photo-curable agent may have a second cut off wavelength of light transmittance (not shown). The second cut off wavelength of light transmittance may be the greatest wavelength at which the transmittance of the second photo-curable agent is about 1.0% and less. The second cut off wavelength of light transmittance may be shorter than the first cut off wavelength of light transmittance W1 and may further be shorter than a first cut off wavelength of light absorbance W2, which will be described later. The second cut off wavelength of light transmittance of the second photo-curable agent may range from about 250 nm to about 320 nm. The second photo-curable agent may include a substituted or unsubstituted acryl group. More particularly, the second photo-curable agent may include a compound of the following Formula 13. Also, the second photo-curable agent may be the same as the first photo-curable agent.

[Formula 13]

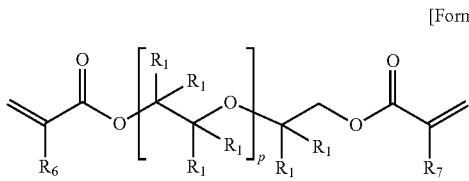

In the above Formula 13, $R_1$ may be independently hydrogen or a halogen atom, $R_6$ and $R_7$ may be independently hydrogen or a methyl group, and p may be an integer from 0 to 100.

In this case, the concentration of the second photo-curable agent may be from about 1 wt % to about 70 wt % with respect to the total amount of the first photo-curable agent PP1 and the second photo-curable agent. In the case that the concentration of the second photo-curable agent is above about 70 wt %, a photo-cured layer L2, which will be described later, may be formed too thick, and a film with a wrinkle structure may not be formed (see FIG. 14). By controlling the concentration of the second photoinitiator in the range from about 0.1 wt % to about 50 wt %, the size of a wrinkle structure on the surface of a film, which will be described later, may be changed.

The composition according to exemplary embodiments of the present invention may further include a third photo-curable agent. The third photo-curable agent may be a solid irrespective of the cut off wavelength of the light transmittance. The third photo-curable agent may include a substituted or unsubstituted styrene or acryl groups.

In this case, the concentration of the third photo-curable agent may be from about 0.1 wt % to about 50 wt % with respect to the total amount of the first photo-curable agent PP1 and the third photo-curable agent. Since the photo-curable solid agent hinders the contraction of the photo-curable liquid agent during UV-curing, a film with a wrinkle structure may not be formed in the case that the concentration of the third photo-curable agent is above about 70 wt % (see FIG. 15). By controlling the concentration of the third photoinitiator in the range from about 1 wt % to about 70 wt %, the size of a wrinkle structure on the surface of a film, which will be described later, may be changed.

The first photoinitiator PI1 may have a first cut off wavelength of light absorbance W2. The first cut off wavelength of light absorbance W2 may be shorter than the first cut off wavelength of light transmittance W1. The first cut off wavelength of light absorbance W2 may be the shortest wavelength among light wavelengths at which the absorbance of a diluted solution in which the first photoinitiator PI1 is dissolved is about 0.05 and less. The light absorbance may be from the diluted solution layer, 10 mm in thickness, of the photoinitiator with from about $6.0 \times 10^{-5}$ to about $3.0 \times 10^{-4}$ mol %. That is, as shown in FIG. 1, the first photoinitiator PI1 may have high absorbance with respect to lights with short wavelengths A, however, may have gradually decreasing absorbance with respect to lights with long wavelengths and the absorbance approaches to near 0%. In this case, the light wavelength at which the absorbance of the first photoinitiator PI1 reaches to about 0.05 may be the first cut off wavelength of light absorbance W2. For example, the absorbance of the first photoinitiator PI1 may be about 0.05 and less at the light wavelengths between W2 to B. However, the cut off wavelength of light absorbance of the present invention may be defined as the smallest light wavelength W2 at which the transmittance becomes about 0.05 and less.

The first cut off wavelength of light absorbance W2 may range from about 250 nm to about 350 nm. Preferably, the first cut off wavelength of light absorbance W2 may be about 310 nm and less. The photoinitiator may include materials having the first cut off wavelength of light absorbance W2, which is blue-shifted on spectrum. For example, the material may include at least one selected from the group consisting of Irgacure 184, Irgacure 651, Irgacure 754, Irgacure 2959, Darocur 1173 and Darocur MBF as a surface cure photoinitiator.

The concentration of the first photoinitiator PI1 may be from about 0.01 wt % to about 10 wt % with respect to the total amount of the composition. As the concentration of the first photoinitiator PI1 increases, the photo-curing rate of the first photo-curable agent PP1 may further increase. Thus, in the case that the concentration of the first photoinitiator PI1 is less than about 0.01 wt %, the photo-curing rate may be too slow, and the film with a wrinkle structure may not be formed. In the case that the concentration of the first photoinitiator PI1 is greater than about 10 wt %, the vinyl group of the first photo-curable agent PP1 may decrease rapidly, and the first cut off wavelength of light transmittance W1 may decrease. In this case, a photo-cured layer L2, which will be described later, may be formed too thick, and a film with a wrinkle structure may not be formed (see FIG. 11). That is, the size of the wrinkle structure may be changed by changing the concentration of the first photoinitiator in a range of forming the wrinkle structure on the film.

In the composition according to exemplary embodiments, the first cut off wavelength of light transmittance W1 of the first photo-curable agent PP1 may be equal to or be greater than the first cut off wavelength of light absorbance W2 of the first photoinitiator PI1. Thus, in the case that lights with longer wavelength than the first cut off wavelength of light transmittance W1 are irradiated to the composition, the first photoinitiator PI1 may not react, and the photocuring of the first photo-curable agent PP1 may not be carried out. Further, in the case that lights with shorter wavelength than the first cut off wavelength of light absorbance W2 are irradiated to the composition, the first photoinitiator PI1 present on the surface of the composition may produce radicals. Thus, photocuring may be carried out only at the surface of the composition.

The composition may further include a monomer. The monomer may be a vinyl monomer with a low molecular weight, and may function as a chain extender to further increase the molecular weight during cross-linking the first photo-curable agent PP1.

The monomer may be included by about 1 wt % to about 70 wt % with respect to the total amount of the composition. The monomer may be at least one selected from the group consisting of 2,3,4,5,6-pentafluorostyrene, methyl methacrylate, methyl acrylate, trifluoroacetic acid allyl ester, trifluoroacetic acid vinyl ester, 2,2,2-trifluoroethyl methacrylate, acrylic acid 1,1,1,3,3,3-hexafluoroisopropyl ester, methacrylic acid 1,1,1,3,3,3-hexafluoroisopropyl ester, 1-pentafluorophenyl-pyrrole-2,5-dione, N-methyl maleimide, N-ethyl maleimide, N-propyl maleimide, N-butyl maleimide, N-tert-butyl maleimide, N-pentyl maleimide and N-hexyl maleimide.

The composition may further include a solvent diluting the first photo-curable agent PP1 or dissolving the third photo-curable agent. The solvent may be included by about 1 wt % to about 99 wt % with respect to the total amount of the composition. The solvent may be at least one selected from the group consisting of cyclopentanone, cyclohexanone, γ-butyrolactone, toluene, methanol, ethanol, propanol, ethyl ether, N,N-dimethyl acetamide, N-methyl pyrrolidinone, tetrahydrofuran, ethyl acetate and hexane.

The composition according to exemplary embodiments may further include a second photoinitiator. The second photoinitiator may have a second cut off wavelength of light absorbance (not shown) greater than the first cut off wavelength of light transmittance W1. The concentration of the second photoinitiator may be from about 0.1 wt % to about 50 wt % with respect to the total amount of the first photoinitiator PI1 and the second photoinitiator. By controlling the concentration of the second photoinitiator, the size of the wrinkle structure at the surface of a film, which will be described later, may be changed. Particular explanation on the second photoinitiator will be given later.

Referring to FIGS. 1 and 2A, a composition layer L1 may be formed on a substrate 110. The composition layer L1 may be formed by coating the composition according to exemplary embodiments explained above referring to FIG. 1. The composition may be coated on the substrate 110 using a spin-coating method, a doctor knife, etc. The composition layer L1 may be obtained by simply coating the composition and may be a liquid layer.

Figure 16:
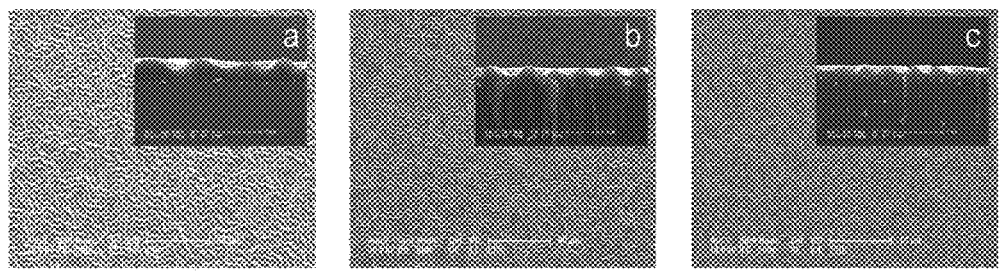
FIG. 16 illustrates plain and cross-sectional SEM images of photo-cured films from a UV3/Irgacure 184 composition with varying spin-coating rate.

The thickness of composition layer L1 may be from about 0.1 μm to about 1000 μm. In an embodiment, in the case that the composition layer L1 is formed using the spin-coating method, the thickness of the composition layer L1 may be controlled by controlling the spin-coating rate of the substrate 110. As the thickness of the composition layer L1 is decreased, the size of a wrinkle structure WS, which will be described later, may be decreased (FIG. 16).

Referring to FIGS. 1 and 2B, the composition layer L1 is exposed to lights 200 to form a photo-cured layer L2 at the upper portion of the composition layer L1. The lights 200 may include a wavelength range capable of activating the photoinitiator and may be, for example, UV rays. The lights 200 may have a wide wavelength range. The wavelength range of the lights 200 may include from the short wavelength A to the long wavelength B of FIG. 1. That is, in the wavelength range of the lights 200, the first cut off wavelength of light transmittance W1 and the first cut off wavelength of light absorbance W2 may be included. More particularly, the lights 200 may be irradiated with a wavelength range from about 200 nm to about 500 nm.

As described above, since the wavelength range of light transmittance of the first photo-curable agent PP1 (for example, W1-B) and the wavelength range of light absorbance of the first photoinitiator PI1 (for example, A-W2) are not overlapped, the photo-curing reaction of the first photocurable agent PP1 may be performed only at the surface of the composition layer L1 at the initial time period of the irradiation even though the composition layer L1 is exposed to the lights 200. Thus, the photo-cured layer L2 may be a thin film formed at the surface of the composition layer L1 in this embodiment. The composition layer L1 under the photo-cured layer L2 may be a layer with a liquid phase as in FIG. 2A. Further, the photo-cured layer L2 may be a solid layer with a high elastic modulus due to the photo-curing of the first photo-curable agent PP1.

During forming the photo-cured layer L2, an apparent first order photo-curing rate constant ($k_{app}$) may be from about 0.01 to about 5.0 $sec^{-1}$. For example, an apparent first order photo-curing rate constant ($k_{app}$) may be from about 0.08 to about 0.86 $min^{-1}$. In the case that the photo-curing rate constant ($k_{app}$) is less than about 0.08 $min^{-1}$ or above about 0.86 $min^{-1}$, the photo-curing rate may become too slow or too fast, and a wrinkle structure may not be formed on the film. In addition, in the case that the photo-curing rate is varied in the above range, the size of a wrinkle structure may be also changed. The photo-curing rate constant ($k_{app}$) may be proportional to the concentration of a photoinitiator, the intensity of light, the concentration of a vinyl group, etc. Thus, the shape and size of the wrinkle structure on the film may be tuned by controlling the photo-curing rate constant ($k_{app}$) in an appropriate range via tuning the above-described factors (the concentration of the photoinitiator, etc.).

Referring to FIGS. 1 and 2C, the lights 200 are irradiated to the photo-cured layer L2 continuously, and a photo-cured film WF may be formed on the substrate. The photo-cured film WF may be a film having a wrinkle structure WS.

Figure 3:
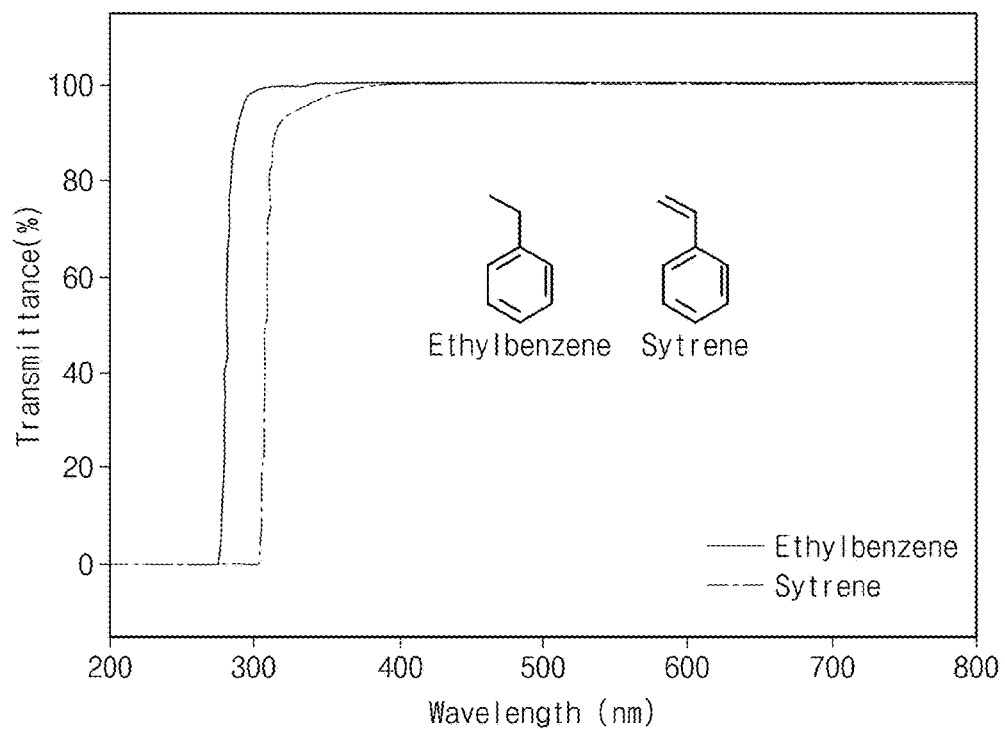
FIG. 3 is the transmittance spectra of styrene and ethylbenzene as model compounds of styrene and polystyrene, respectively.

FIG. 3 is the transmittance spectra of styrene and ethylbenzene as model compounds of styrene and polystyrene, respectively. Referring to FIG. 3, the transmittance spectrum of ethylbenzene exhibited blue-shifted when compared to that of styrene because ethylbenzene has no conjugated vinyl group. The same results would occur in the first photo-curable agent PP1.

The composition layer L1 with a liquid phase may be cured as the photo-curing reaction continuously carried out after forming the photo-cured layer L2. When the photo-cured layer L2 is formed, the number of the double bond of the vinyl group may decrease, and the transmittance spectrum of the photo-cured layer L2 may be blue-shifted. Thus, the light transmittance may be increased, and the composition layer L1 may be also cured (see FIG. 3). In this case, the composition layer L1 may shrink while being cured. Also, the photo-cured layer L2 with a high elastic modulus may be deformed to release the stress applied thereto, and the wrinkle structure WS may be formed. Here, the size of the wrinkle structure formed subsequently may be changed according to the thickness of the composition layer L1 with the liquid phase.

The irradiation of the lights 200 explained referring to FIGS. 2B and 2C may be performed for about 1 to about 30 min under an inert gas such as nitrogen or under vacuum. After the irradiation of the lights 200, heat treatment may be further performed on the photo-cured film WF at about 100° C. to about 300° C. In this case, the heat treatment may be performed under an inert gas such as nitrogen or under vacuum The photocured film WF thus formed may be applied to a light scattering layer of an OLED as described above and may be also applied to a light extraction film for diverse displays and illuminations and photo sensors.

Figure 4:
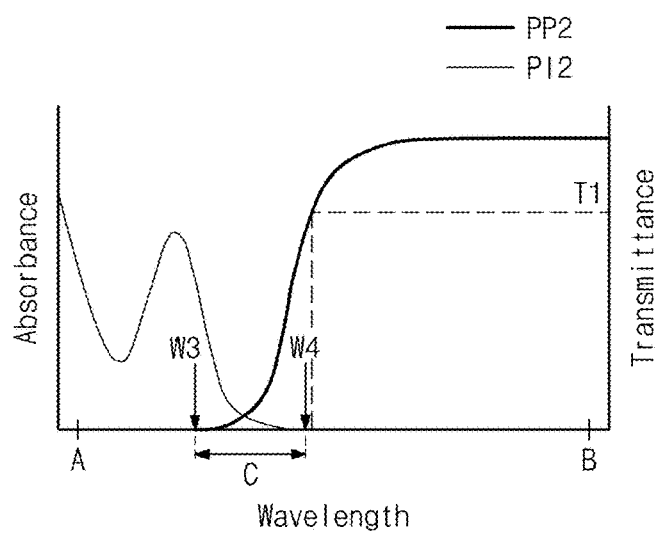
FIG. 4 is a graph showing the transmittance spectrum of a photo-curable agent and the absorbance spectrum of a photoinitiator according to comparative examples in the present invention.
Figure 5A:
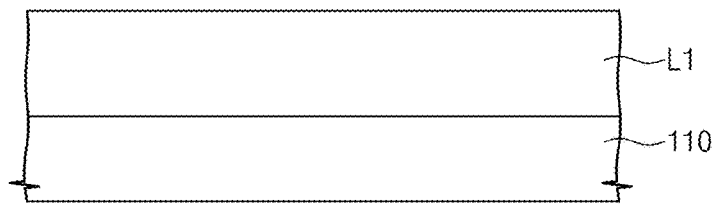
FIGS. 5A to 5C are cross-sectional views schematically illustrating a method of forming a film without a wrinkle structure according to comparative examples in the present invention.
Figure 5B:
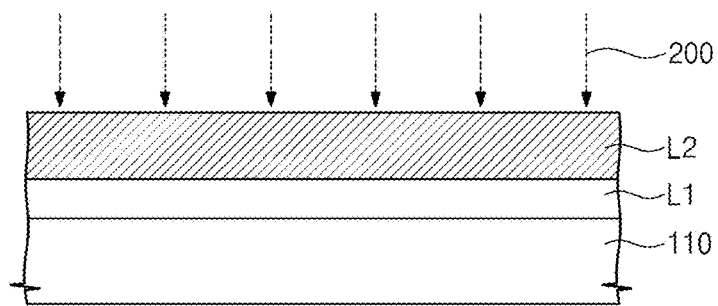
Figure 5C:
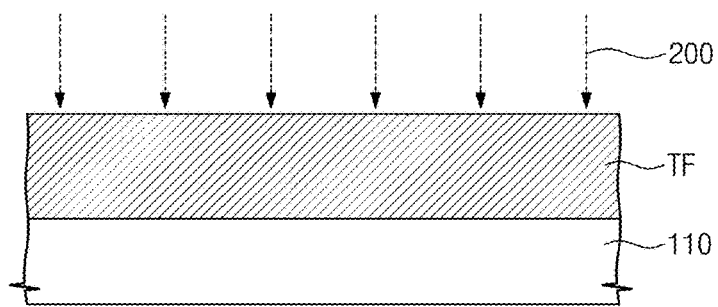

FIG. 4 is a graph showing the transmittance spectrum of a photo-curable agent and the absorbance spectrum of a photoinitiator according to comparative examples in the present invention. FIGS. 5A to 5C are cross-sectional views schematically illustrating a method of forming a film without a wrinkle structure according to comparative examples in the present invention. Repeated technical points described above referring to FIGS. 1 and 2A to 2C will be omitted, and the different points will be explained in detail. The same reference numerals will be designated for the same elements explained in the method of forming a film with a wrinkle structure for explaining the concept of the present invention.

Referring to FIG. 4, the composition for forming a transparent film according to a comparative example may include a second photo-curable agent PP2 and a photoinitiator. The photoinitiator may be a first photoinitiator PI1 or a second photoinitiator PI2. The second photo-curable agent PP2 may have a second cut off wavelength of light transmittance W3. The second cut off wavelength of light transmittance W3 of the second photo-curable agent PP2 may range from about 250 nm to about 320 nm. The second photo-curable agent PP2 may include a substituted or unsubstituted acryl group. More particularly, the second photo-curable agent PP2 may include a compound of the following Formula 13. Also, the second photo-curable agent PP2 may be the same as the first photo-curable agent PP1.

[Formula 13]

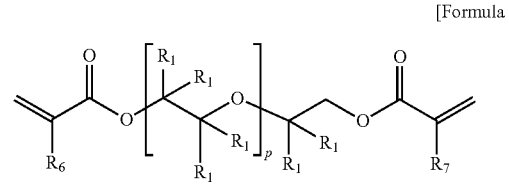

In the above Formula 13, $R_1$ may be each independently hydrogen or a halogen atom, $R_6$ and $R_7$ may be each independently hydrogen or a methyl group, and p may be an integer from 0 to 100.

The second photoinitiator PI2 may have a second cut off wavelength of light absorbance W4. The second cut off wavelength of light absorbance W4 may be the same as the first cut off wavelength of light absorbance W2 of the first photoinitiator PI1 explained referring to FIG. 1. In addition, the second cut off wavelength of light absorbance W4 may be greater than the second cut off wavelength of light transmittance W3. For example, the second photoinitiator PI2 may include Darocur TPO, Darocur 1173, Darocur MBF, Irgacure 184, Irgacure 651, Irgacure 754, Irgacure 2959, Irgacure 369, Irgacure 907, Irgacure 819, Irgacure 2100, Irgacure 784, and Irgacure 250.

In the wavelength range C from W3 to W4, the second photo-curable agent PP2 may have transmittance more than 0%, and the second photoinitiator PI2 may have absorbance more than 0. Thus, when the composition is exposed to lights containing the above wavelength range C, a photo-curing reaction may be carried out in the composition to a certain depth because the lights penetrate the composition to the certain depth.

Referring to FIGS. 4 and 5A, a composition layer L1 may be formed on a substrate 110. The composition layer L1 may be formed by coating the composition according to this comparative example as explained above referring to FIG. 4.

Referring to FIGS. 4 and 5B, the composition layer L1 is exposed to lights 200 to form a photo-cured layer L2 at the upper portion of the composition layer L1. The photo-cured layer L2 may have a first thickness D1.

In FIG. 2B, since the wavelength range of light transmittance of the first photo-curable agent PP1 (for example, W1-B) and the wavelength range of light absorbance of the first photoinitiator PI1 (for example, A-W2) are not overlapped, the photocured layer L2 may be formed as a thin film. On the contrary, the wavelength range of light transmittance of the second photo-curable agent PP2 (for example, W3-B) and the wavelength range of light absorbance of the second photoinitiator PI2 (for example, A-W4) may be overlapped in the wavelength range C from W3 to W4. Thus, in FIG. 5B, the lights 200 may penetrate to a certain depth according to the transmittance (T1) of the second photo-curable agent PP2 at the initial time period of the irradiation, and the photo-cured layer L2 may have the thickness greater than the thickness of the photo-cured layer L2 in FIG. 2B. As the wavelength range C increases, the thickness of the photo-cured layer L2 at the initial time period of the irradiation may increase.

Referring to FIGS. 4 and 5C, the photo-cured layer L2 may be exposed to the lights 200 continuously to from a photo-cured film TF on the substrate. Different from the photo-cured film explained referring to FIG. 2C, the photo-cured film TF may not have a wrinkle structure. The photo-cured layer L2 is not a thin film but a layer having a relatively thick first thickness D1, and the wrinkle structure may not be formed even though the remaining composition layer L1 is cured and shrunk.

As described above, the present invention may include a composition obtained by dissolving a photoinitiator in a photo-curable agent, in which the wavelength of light absorbance of the photoinitiator and the wavelength of the light transmittance of the photo-curable agent may not be overlapped. That is, since the wavelength range of light transmittance of the photo-curable agent and the wavelength range of light absorbance of the photoinitiator are not overlapped each other, a film with a wrinkle structure may be easily formed by simply irradiating UV rays to the composition layer. In an embodiment, the film with the wrinkle structure may be applied to a light scattering layer for OLED.

EXPERIMENTAL EXAMPLE 1

Transmittance Spectrum of Styrene and Acryl Monomers

Methyl methacrylate (MMA) and methyl acrylate (MA) were prepared as acryl monomers. Styrene (St) and 2,3,4, 5,6-pentafluorostyrene (PFSt) were prepared as styrene monomers. The ultraviolet transmittance spectra of the acryl and the styrene monomers are shown in FIG. 6.

Figure 6:
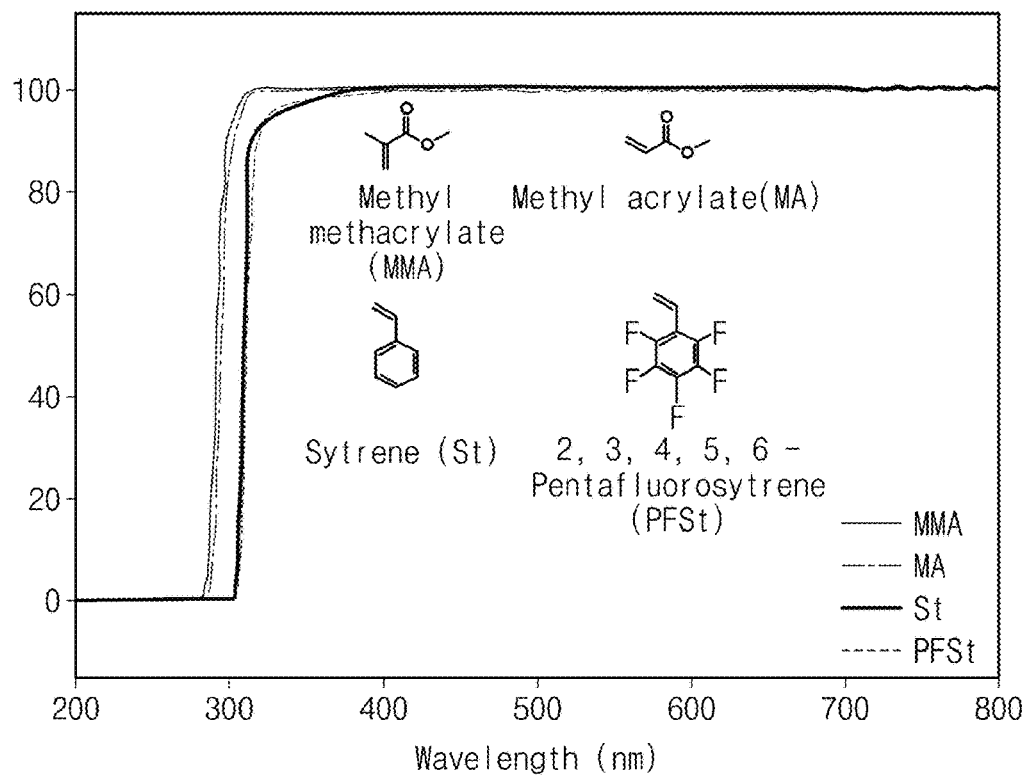
FIG. 6 is a graph showing the transmittance spectra of acryl and styrene monomers.

As shown in FIG. 6, it may be secured that the cut off wavelength of light transmittance of the styrene monomers St and PFSt are over about 300 nm, however the cut off wavelength of light transmittance of the acryl monomers MMA and MA are under about 300 nm. That is, it may be secured that the cut off wavelength of light transmittance of the styrene monomers St and PFSt is red-sifted compared to that of the acryl monomers MMA and MA due to a conjugated vinyl group.

EXPERIMENTAL EXAMPLE 2

Synthesis of 1,2,4,5-tetrafluoro-3-(2-{2-[2-(2-{2,3, 5,6-tetrafluoro-4-vinyl-phenoxy}-ethoxy)-ethoxy]-ethoxyl}-ethoxy)-6-vinyl-benzene [UV5]

UV5 was synthesized according to the following Reaction 1 as a photo-curable agent according to an embodiment of the present invention.

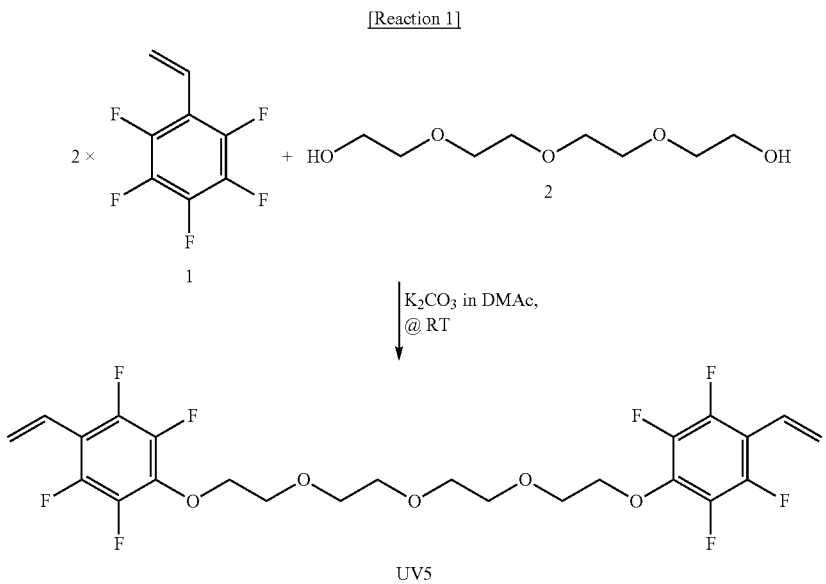

Referring to the above Reaction 1, under nitrogen, 12.0 g of tetraethylene glycol 2 and 26.0 g of 2,3,4,5,6-pentafluorostyrene 1 were dissolved in 30 mL of anhydrous dimethyl acetamide (DMAc) in a 250 mL, two-necked flask. 28.0 g of potassium carbonate was added thereto as a reaction catalyst. The reaction was performed under nitrogen at room temperature for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/2, v/v) for purification. After the eluent was completely removed using a vacuum evaporator, the transparent colorless liquid product UV5 was dried at about 35° C. for about 48 hours under vacuum. Yield: 13.9 g (41%). IR $v_{max}$(liquid, NaCl)/cm$^{-1}$: 3032w (=C—H str., vinyl); 2940, 2987m (C—H str., methylene); 1647, 1632m (C=C str., aromatic and vinyl); 1455m (C—H ben., methylene); 1120s (C—O str., ether); 1156s (C—F str., aromatic). $^1$H NMR $\delta_H$ (CDCl$_3$, 300 MHz): 6.67-6.56 (2H, m, vinyl); 6.08-5.60 (4H, m, vinyl); 4.38 (4H, t, methylene); 3.85 (4H, t, methylene); 3.71-3.60 (8H, m, methylene). $^{19}$F NMR $\delta_F$ (CDCl$_3$, 300 MHz): −145.30 (4F, m); −158.19 (4F, m). MS(m/z): calcd. 542.42; found 542.

EXPERIMENTAL EXAMPLE 3

Synthesis of 1,2,4,5-tetrafluoro-3-(2-{2-[2,3,5,6-tetrafluoro-4-vinyl-phenoxy]-ethoxy}-ethoxy)-6-vinyl-benzene [UV3]

UV3 was synthesized according to the following Reaction 2 as a photo-curable agent according to an embodiment of the present invention.

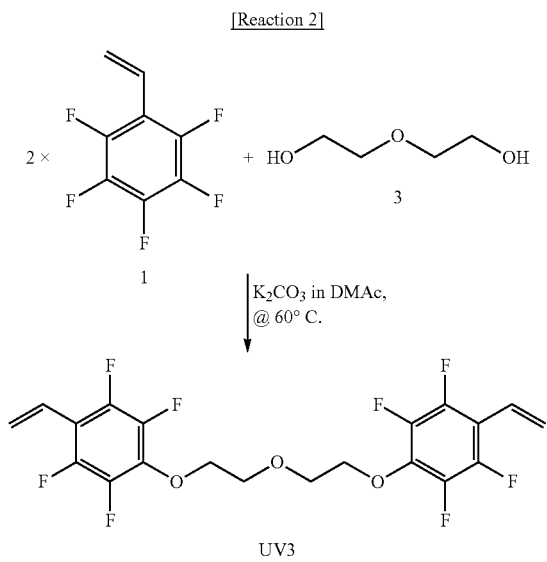

[Reaction 2]

Referring to the above Reaction 2, under nitrogen, 4.5 g of diethylene glycol 3 and 16.5 g of 2,3,4,5,6-pentafluorostyrene 1 were dissolved in 30 mL of anhydrous DMAc in a 250 mL, two-necked flask. 18.0 g of potassium carbonate was added thereto as a reaction catalyst. The reaction was performed under nitrogen at about 60° C. for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/2, v/v) for purification. After the eluent was completely removed using a vacuum evaporator, the transparent colorless liquid product UV3 was dried at about 35° C. for about 48 hours under vacuum. Yield: 7.4 g (43%). IR $v_{max}$(Liquid, NaCl)/cm$^{-1}$: 3030w (=C—H str., vinyl); 2945, 2990m (C—H str., methylene); 1642, 1630m (C=C str., aromatic and vinyl); 1453m (C—H ben., methylene); 1121s (C—O str., ether); 1151s (C—F str., aromatic). $^1$H NMR $\delta_H$ (CDCl$_3$, 300 MHz): 6.76-6.57 (2H, m, vinyl); 6.04-5.61 (4H, m, vinyl); 4.38 (4H, t, methylene); 3.90 (4H, t, methylene). $^{19}$F NMR $\delta_F$ (CDCl$_3$, 300 MHz): −145.34 (4F, m); −158.94 (4F, m): MS(m/z): calcd. 454.31; found 454.

EXPERIMENTAL EXAMPLE 4

Synthesis of 1,2,4,5-Tetrafluoro-3-[2-(2,3,5,6,-tetrafluoro-4-vinyl-phenoxy)-ethoxy]-6-vinyl-benzene [UV2]

UV2 was synthesized according to the following Reaction 3 as a photo-curable agent according to an embodiment of the present invention.

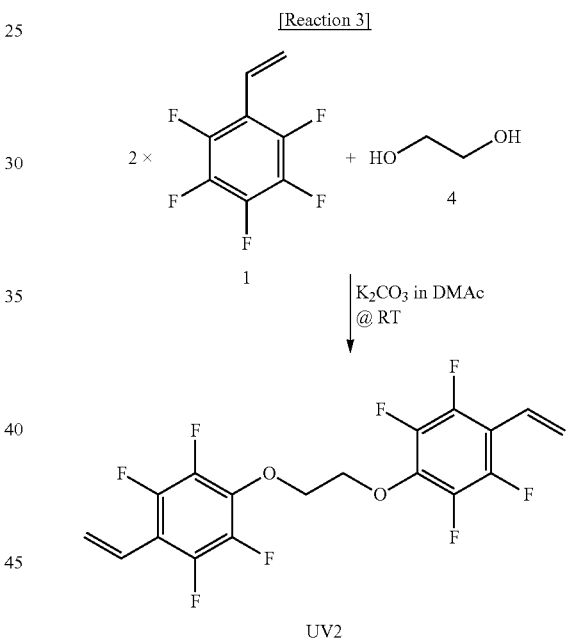

[Reaction 3]

Referring to the above Reaction 3, under nitrogen, 8.4 g of ethylene glycol 4 and 17.9 g of 2,3,4,5,6-pentafluorostyrene 1 were dissolved in 25 mL of anhydrous DMAc in a 250 mL, two-necked flask. 13.0 g of potassium carbonate was added thereto as a reaction catalyst. The reaction was performed under nitrogen at room temperature for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the white solid product UV2 was dried at about 35° C. for about 48 hours under vacuum. Yield: 8.0 g (37%). m.p.: 71° C. IR $v_{max}$(Solid, KBr)/cm$^{-1}$: 3128w (=C—H str., vinyl); 2994, 2948m (C—H str., methylene); 1648, 1629m (C=C str., aromatic and vinyl); 1447m (C—H ben., methylene); 1154s (C—F str., aromatic); 1118s (C—O str., ether). $^1$H NMR $\delta_H$ (CDCl$_3$, 300 MHz): 6.68-6.61 (2H, m, vinyl); 6.01-5.65 (4H, m, vinyl); 4.59 (4H, s, methylene); $^{19}$F NMR $\delta_F$ (CDCl$_3$, 300 MHz): −145.84 (4F, m,); −159.32 (4F, m). MS(m/z): calcd. 410.26; found 410.

EXPERIMENTAL EXAMPLE 5

Synthesis of 1-(2-{2-[2-(1,1-difluoro-2-{2,3,5,6-tetrafluoro-4-vinyl-phenoxy}-ethoxy)-1,1,2,2-tetra-fluoro-ethoxy]-1,1,2,2-tetrafluoro-ethoxy}-2,2-difluoro-ethoxy)-2,3,5,6-tetrafluoro-4-vinyl-benzene [UVF5]

UVF5 was synthesized according to the following Reaction 4 as a photo-curable agent according to an embodiment of the present invention.

liquid was applied to a column with ethyl acetate/hexane (1/5, v/v) for purification. After the eluent was completely removed using a vacuum evaporator, the transparent colorless liquid product UVF5 was dried at about 35° C. for about 48 hours under vacuum. Yield: 21.5 g (77%). IR $v_{max}$ (Liquid, NaCl)/cm$^{-1}$: 3038w (=C—H str., vinyl); 2970w (C—H str., methylene); 1432m (C=C str., aromatic and vinyl); 1211, 1092s (C—O str., ether). $^1$H NMR $\delta_H$ (CDCl$_3$, 300 MHz): 6.69-6.59 (2H, m, vinyl); 6.11-5.67 (4H, m, vinyl); 4.54 (4H, t, methylene). $^{19}$F NMR $\delta_F$ (CDCl$_3$, 300 MHz): −78.70 (4F, m); −88.87 (4F, m); −89.05 (4F, s); −144.34 (4F, m); −158.13 (4F, m). MS(m/z): calcd. 758.30; found 758.

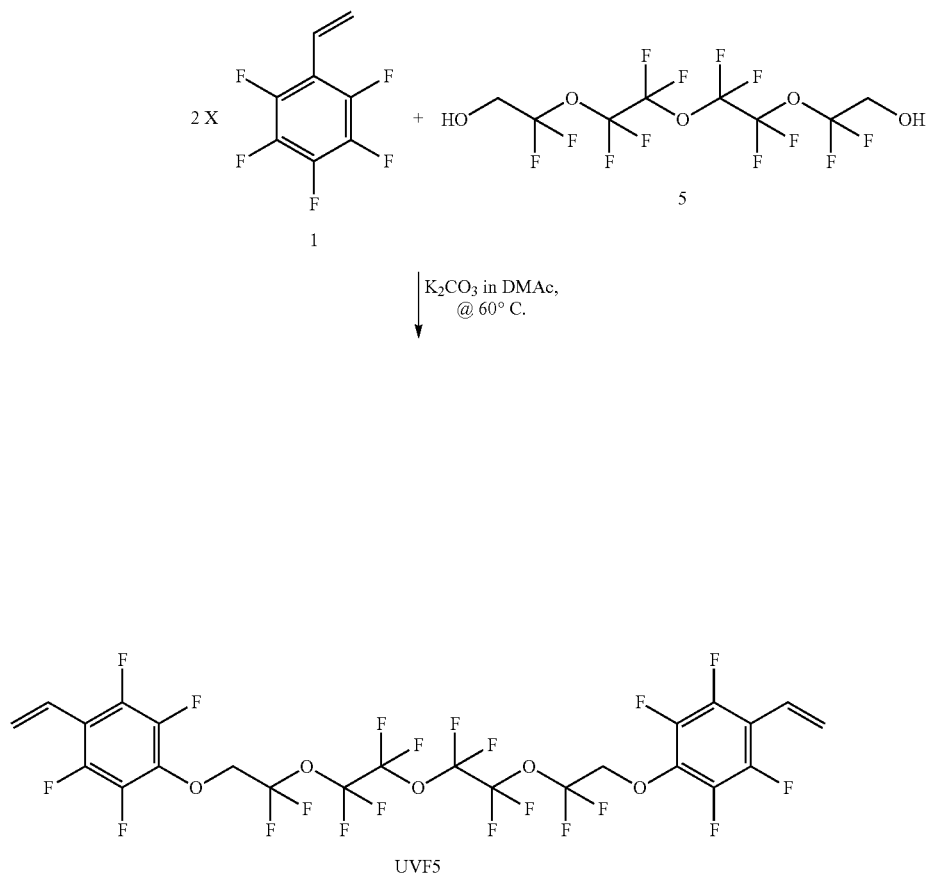

[Reaction 4]

Referring to the above Reaction 4, under nitrogen, 15.0 g of fluorinated tetraethylene glycol 5 and 14.2 g of 2,3,4,5,6-pentafluorostyrene 1 were dissolved in 50 mL of anhydrous DMAc in a 250 mL, two-necked flask. 15.0 g of potassium carbonate was added thereto as a reaction catalyst. The reaction was performed under nitrogen at about 60° C. for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude

EXPERIMENTAL EXAMPLE 6

Synthesis of 1-(2-{2-[1,1-difluoro-2-(2,3,5,6-tetrafluoro-4-vinyl-phenoxy)-ethoxy]-1,1,2,2-tetrafluoro-ethoxy}-2,2-difluoro-ethoxy)-2,3,5,6-tetrafluoro-4-vinyl-benzene [UVF4]

UVF4 was synthesized according to the following Reaction 5 as a photo-curable agent according to an embodiment of the present invention.

[Reaction 5]

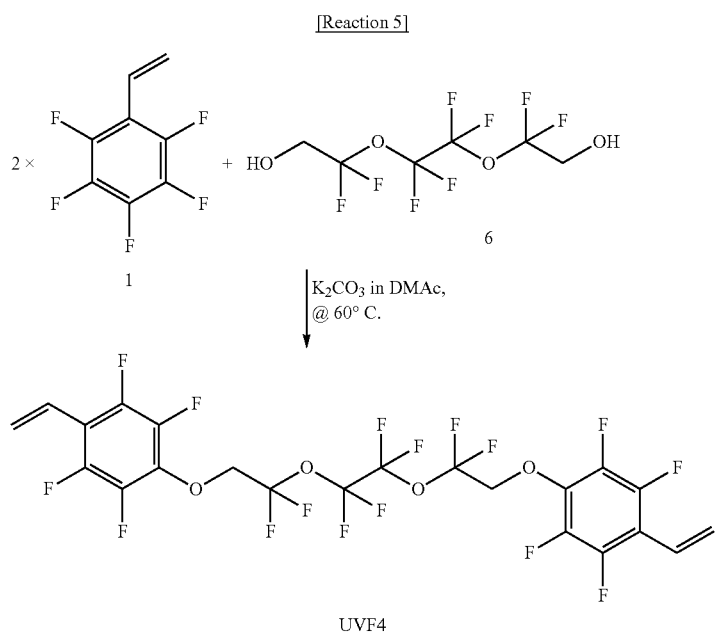

Referring to the above Reaction 5, under nitrogen, 10.0 g of fluorinated triethylene glycol 6 and 13.2 g of 2,3,4,5,6-pentafluorostyrene 1 were dissolved in 40 mL of anhydrous DMAc in a 250 mL, two-necked flask. 14.0 g of potassium carbonate was added thereto as a reaction catalyst. The reaction was performed under nitrogen at about 60° C. for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the transparent colorless liquid product UVF4 was dried at about 35° C. for about 48 hours under vacuum. Yield: 16.0 g (73%). IR $v_{max}$(Liquid, NaCl)/cm$^{-1}$: 3037w (=C—H str., vinyl); 2970w (C—H str., methylene); 1432m (C=C str., aromatic and vinyl); 1186, 1091s (C—O str., ether). $^1$H NMR $\delta_H$ (CDCl$_3$, 300 MHz): 6.44-6.37 (2H, m, vinyl); 6.18-5.68 (4H, m, vinyl); 4.54 (4H, t, methylene). $^{19}$F NMR $\delta_F$ (CDCl$_3$, 300 MHz): −78.76 (4F, t); −89.10 (4F, m); −144.34 (4F, m); −158.06 (4F, m). MS(m/z): calcd. 642.29; found 642.

EXPERIMENTAL EXAMPLE 7

Synthesis of 2-(2-{2-[1,1-difluoro-2-(2,3,5,6-tetra-fluoro-4-vinyl-phenoxy)-ethoxy]-1,1,2,2-tetrafluoro-ethoxy}-1,1,2,2-tetrafluoro-ethoxy)-2,2-difluoro-ethanol [7]

Intermediate 7 was synthesized according to the following Reaction 6 as an intermediate of photo-curable agent according to an embodiment of the present invention.

[Reaction 6]

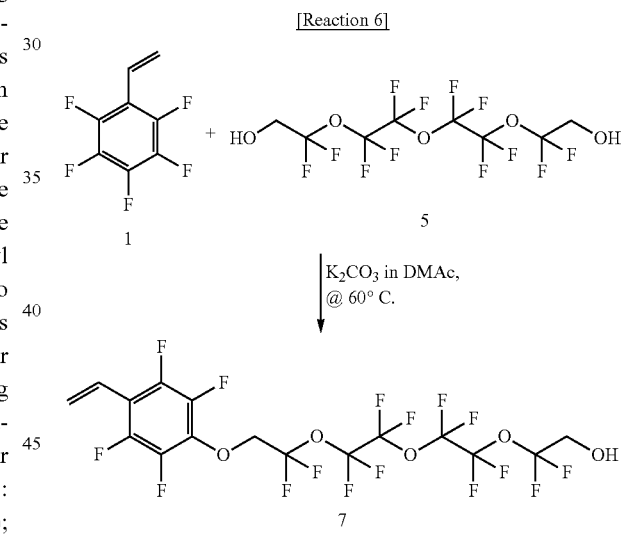

Referring to the above Reaction 6, under nitrogen, 20.0 g of fluorinated tetraethylene glycol 5 and 11.4 g of 2,3,4,5,6-pentafluorostyrene 1 were dissolved in 40 mL of anhydrous DMAc in a 250 mL, two-necked flask. 10.2 g of potassium carbonate was added thereto as a reaction catalyst. The reaction was performed under nitrogen at about 60° C. for about 24 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the transparent colorless liquid product 7 was dried at about 35° C. for about 48 hours under vacuum. Yield: 12.8 g (45%). IR $v_{max}$(Liquid, NaCl)/cm$^{-1}$: 3377m (O—H str., hydroxyl); 3038w (=C—H str., vinyl); 2965w (C—H str., methylene); 1647m (C=C str., vinyl, and aromatic); 1203, 1092s (C—O str., ether). $^1$H NMR $\delta_H$ (CDCl$_3$, 300 MHz): 6.70-6.60 (1H, m, vinyl); 6.11-5.68 (2H, m, vinyl); 4.54 (2H, t, methylene); 3.95 (2H, t, methylene); 2.65 (1H, s, hydroxyl). $^{19}$F NMR $\delta_F$ (CDCl$_3$, 300 MHz): −78.67 (2F, m); −80.91 (2F, m); −88.92 (4F, m); −89.09 (4F, s); −144.39 (2F, m); −158.19 (2F, m). MS(m/z): calcd. 584.21; found 584.

EXPERIMENTAL EXAMPLE 8

Synthesis of 2,3,5,6,2',3',5',6'-octafluoro-4,4'-bis-[2-(2-{2-[1,1-difluoro-2-(2,3,5,6-tetrafluoro-4-vinyl-phenoxy)-ethoxy]-1,1,2,2-tetrafluoro-ethoxy}-1,1,2,2-tetrafluoro-ethoxy)-2,2-difluoro-ethoxy]-biphenyl [UVDF5]

UVDF5 was synthesized according to the following Reaction 7 as a photo-curable agent according to an embodiment of the present invention.

(61%). IR $v_{max}$(Liquid, NaCl)/cm$^{-1}$: 3038w (=C—H str., vinyl); 2971w (C—H str., methylene); 1649w (C=C str., vinyl, and aromatic); 1210, 1115s (C—O str., ether); 939m (=C—H oop ben., vinyl). $^1$H NMR $\delta_H$ (CDCl$_3$, 300 MHz): 6.69-6.59 (2H, m, vinyl); 6.11-5.68 (4H, m, vinyl); 4.64 (4H, t, methylene); 4.54 (4H, t, methylene). $^{19}$F NMR $\delta_F$ (CDCl$_3$, 300 MHz): −78.70 (8F, m); −88.89 (8F, m); −89.07 (8F, m); −138.67 (4F, m); −144.39 (4F, m); −155.90 (4F, m); −158.21 (4F, m). MS(m/z): calcd. 1462.51; found 1462.

EXPERIMENTAL EXAMPLE 9

Synthesis of 2-(2,3,5,6-Tetrafluoro-4-vinyl-phenoxy)-ethanol [9]

Intermediate 9 was synthesized according to the following Reaction 8 as an intermediate of photo-curable agent according to an embodiment of the present invention.

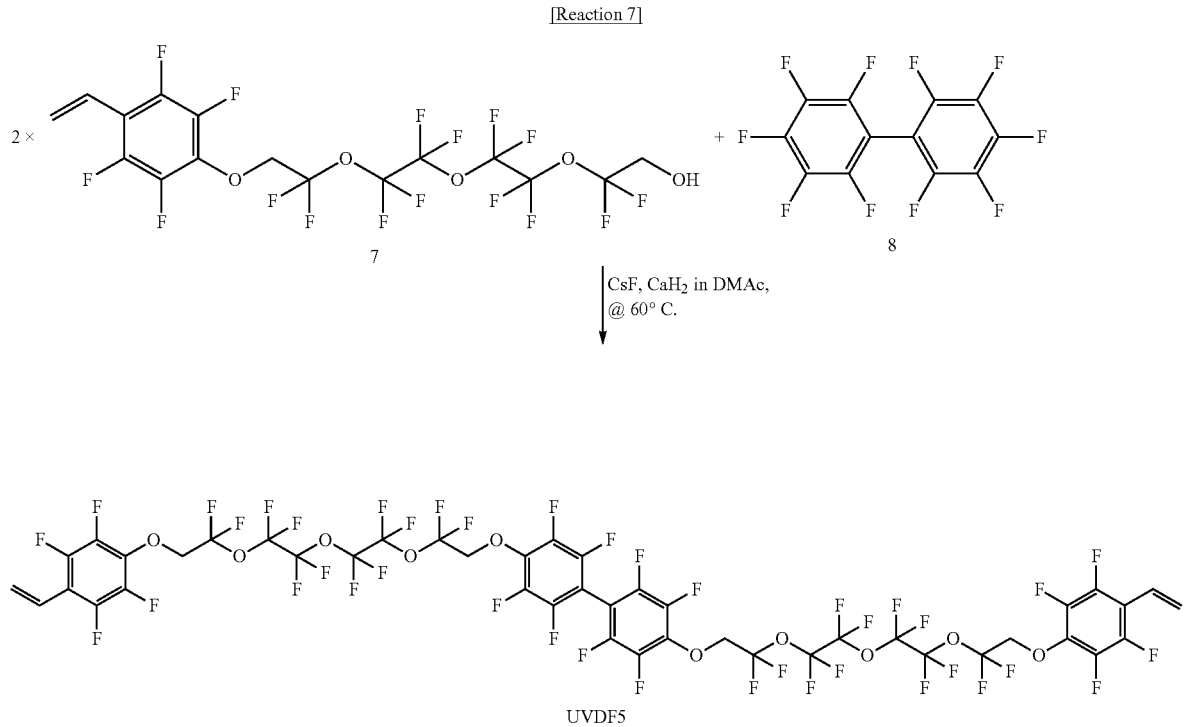

Referring to the above Reaction 7, under nitrogen, 5.3 g of intermediate 7 obtained in Experimental Example 7 and 1.5 g of decafluorobiphenyl 8 were dissolved in 15 mL of anhydrous DMAc in a 50 mL, two-necked flask. 0.1 g of cesium fluoride and 0.6 g of calcium hydride were added thereto as reaction catalysts. The reaction was performed under nitrogen at about 60° C. for about 48 hours. After the reaction catalysts were removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the transparent colorless liquid product UVDF5 was dried at about 35° C. for about 48 hours under vacuum. Yield: 4.0 g

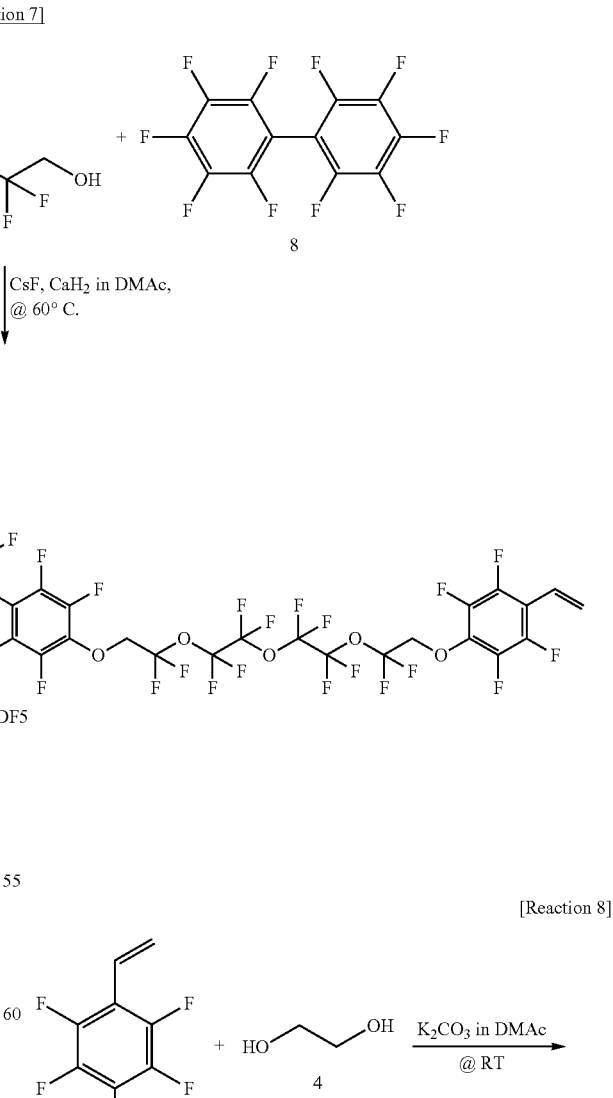

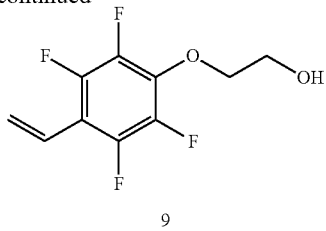

Referring to the above Reaction 8, under nitrogen, 8.4 g of ethylene glycol 4 and 17.9 g of 2,3,4,5,6-pentafluorostyrene 1 were dissolved in 25 mL of anhydrous DMAc in a 100 mL, two-necked flask. 13.0 g of potassium carbonate was added thereto as a reaction catalyst. The reaction was performed under nitrogen at room temperature for about 24 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the transparent colorless liquid product 9 was dried at about 35° C. for about 48 hours under vacuum. Yield: 7.5 g (35%). $^1$H NMR $\delta_H$ (CDCl$_3$, 300 MHz): 6.69-6.56 (1H, m, vinyl); 5.60-5.56 (2H, m, vinyl); 4.30 (2H, t, methylene); 4.14 (2H, t, methylene); 2.15 (1H, s, hydroxyl). $^{19}$F NMR $\delta_F$ (CDCl$_3$, 300 MHz): −145.81 (2F, m); −158.98 (2F, m). MS(m/z): calcd. 236.16; found 236.

EXPERIMENTAL EXAMPLE 10

Synthesis of 2-methyl-acrylic acid-2-(2,3,5,6-tetrafluoro-4-vinyl-phenoxy)-ethyl ester [UVA2]

UVA2 was synthesized according to the following Reaction 9 as a photo-curable agent according to an embodiment of the present invention.

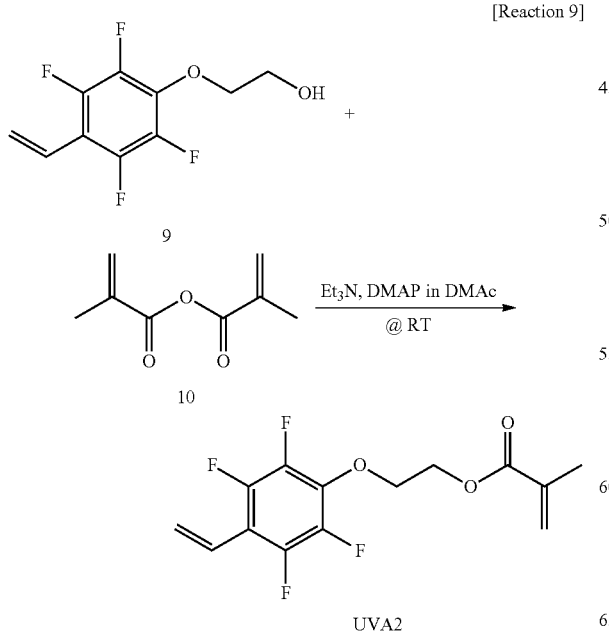

Referring to the above Reaction 9, under nitrogen, 3.1 g of intermediate 9 obtained in Experimental Example 9 and 2.5 g of methacrylic anhydride 10 were dissolved in 10 mL of anhydrous DMAc in a 50 mL, two-necked flask. 2.8 mL of triethylamine (Et$_3$N) and 0.1 g of 4-dimethyl aminopyridine (DMAP) were added thereto as reaction catalysts. The reaction was performed under nitrogen at room temperature for about 24 hours. The reactant was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/20, v/v) for purification. After the eluent was completely removed using a vacuum evaporator, the transparent colorless liquid product UVA2 was dried at about 35° C. for about 48 hours under vacuum. Yield: 1.8 g (44%). $^1$H NMR $\delta_H$ (CDCl$_3$, 300 MHz): 6.63-6.53 (1H, m, vinyl); 6.06-5.96 (2H, m, vinyl); 5.62-5.55 (2H, m, vinyl); 4.44 (4H, s, methylene); 1.90 (3H, s, methyl). $^{19}$F NMR $\delta_F$ (CDCl$_3$, 300 MHz): −145.22 (2F, m); −158.68 (2F, m). MS(m/z): calcd. 304.24; found 304.

EXPERIMENTAL EXAMPLE 11

Synthesis of 1-[2,3-di-(2,3,5,6,-tetrafluoro-4-vinyl-phenoxy)-propoxy]-2,3,5,6-tetrafluoro-4-vinyl-benzene [UV33]

UV33 was synthesized according to the following Reaction 10 as a photo-curable agent according to an embodiment of the present invention.

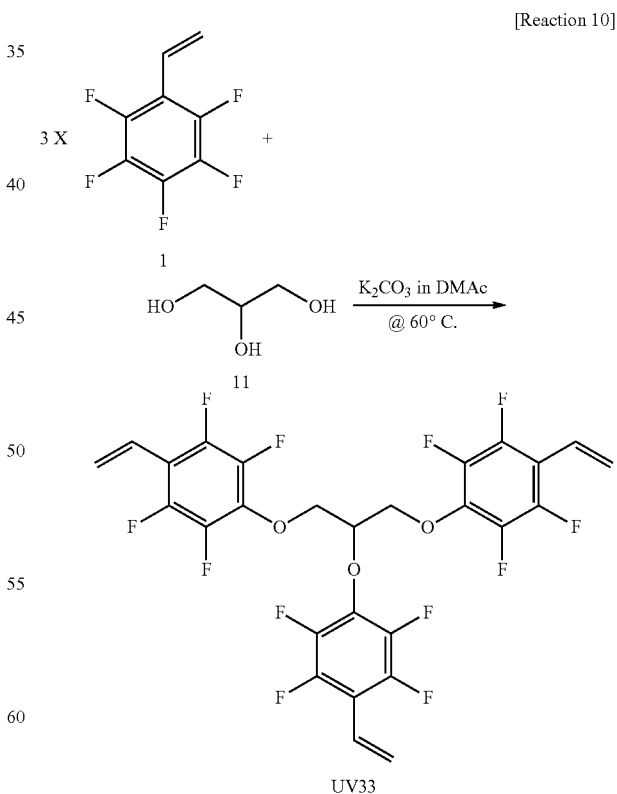

Referring to the above Reaction 10, under nitrogen, 3.0 g of glycerin 11 and 19.2 g of 2,3,4,5,6-pentafluorostyrene 1 were dissolved in 20 mL of anhydrous DMAc in a 250 mL, two-necked flask. 16.2 g of potassium carbonate was added thereto as a reaction catalyst. The reaction was performed under nitrogen at 60° C. for about 48 hours. After potassium carbonate was removed, the remaining solution was poured into distilled water. The reaction product was extracted with ethyl acetate, and ethyl acetate was vacuum-evaporated at room temperature to obtain a viscous brown liquid. The brown crude liquid was applied to a column with ethyl acetate/hexane (1/5, v/v) for purification. After the eluent was completely removed using a vacuum evaporator, the white solid product UV33 was dried at about 35° C. for about 48 hours under vacuum. Yield: 12.7 g (80%). m.p.: 55° C. IR $v_{max}$(Solid, KBr)/cm$^{-1}$: 3037w (=C—H str., vinyl); 2969, 2914m (C—H str., methylene); 1647, 1632m (C=C str., aromatic and vinyl); 1456m (C—H ben., methylene); 1151s (C—F str., aromatic); 1123s (C—O str., ether). $^1$H NMR $\delta_H$ (CDCl$_3$, 300 MHz): 6.71-6.60 (3H, m, vinyl); 6.11-5.66 (6H, m, vinyl); 4.90-4.84 (1H, m, propylene); 4.76-4.64 (4H, m, propylene); $^{19}$F NMR $\delta_F$ (CDCl$_3$, 300 MHz): −145.38 (6F, m,); −158.67 (6F, m). MS(m/z): calcd. 614.38; found 614.

EXPERIMENTAL EXAMPLE 12

Purification of Tetraethylene Glycol Dimethacrylate (TEGDMA) and Tetraethylene Glycol Diacrylate (TEGDA)

TEGDMA and TEGDA were prepared as photo-curable agents according to comparative examples. Each of commercial TEGDMA and TEGDA was applied to a column with ethyl acetate/hexane (1/1, v/v) for purification. The purified products were dried at about 35° C. for about 48 hours under vacuum. TEGDMA is a compound of the following Formula 14, and TEGDA is a compound of the following Formula 15.

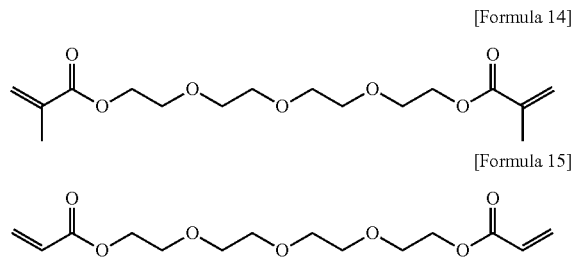

[Formula 14]

[Formula 15]

EXPERIMENTAL EXAMPLE 13

Preparation of Photo-curable Compositions of TEGDMA/Irgacure 184, UV5/Darocur TPO, divinylbenznene (DVB)/Irgacure 184, UV3/Irgacure 184, UVF5/Irgacure 184, UVF4/Irgacure 184 and UVDF5/Irgacure 184

0.0285 g of Irgacure 184 as a photoinitiator was completely dissolved in 1.0 g of TEGDMA prepared in Experimental Example 12 (Comparative Example 1). 0.0254 g of Darocur TPO as a photoinitiator was completely dissolved in 1.0 g of UV5 prepared in Experimental Example 2 (Comparative Example 2). 0.0604 g of Irgacure 184 as a photoinitiator was completely dissolved in 1.0 g of DVB with purity of about 80% (Example 1). 0.0358 g of Irgacure 184 as a photoinitiator was completely dissolved in 1.0 g of UV3 prepared in Experimental Example 3 (Example 2). 0.0214 g of Irgacure 184 as a photoinitiator was completely dissolved in 1.0 g of UVF5 prepared in Experimental Example 5 (Example 3). 0.0253 g of Irgacure 184 as a photoinitiator was completely dissolved in 1.0 g of UVF4 prepared in Experimental Example 6 (Example 4). 0.0036 g of Irgacure 184 as a photoinitiator was completely dissolved in 1.0 g of UVDF5 prepared in Experimental Example 8 and diluted using ethyl acetate to obtain an about 30% solution (Example 5). 0.0416 g of Irgacure 184 as a photoinitiator was completely dissolved in 1.0 g of UVA2 prepared in Experimental Example 10 (Example 6). The composition solutions of Comparative Examples 1 and 2 and Examples 1 to 6 were filtered with a 0.2 μm Teflon filter to remove all insoluble minute particles.

EXPERIMENTAL EXAMPLE 14

Preparation of UV5/Irgacure 184 Photo-curable Composition 2.1044 g of UV5 prepared in Experimental Example 2 was completely dissolved in 0.1278 g of Irgacure 184 as a photoinitiator (Example 7-6). In addition, compositions having the various concentration of the photoinitiator from about 0.5 wt % to about 6.0 wt % were prepared by using this solution and a pure UV5, as shown in Table 1. The composition solutions were filtered with a 0.2 μm Teflon filter to remove all insoluble minute particles.

TABLE 1

| Concentration of photoinitiator (wt %) | |
|---|---|
| 0.5 | Example 7-1 |
| 1.0 | Example 7-2 |
| 2.0 | Example 7-3 |
| 3.0 | Example 7-4 |
| 5.0 | Example 7-5 |
| 6.0 | Example 7-6 |

EXPERIMENTAL EXAMPLE 15

Measurement of Photo-curing Rate of UV5/Irgacure 184 Composition Layer

Each of the compositions (Examples 7-1 to 7-6) with different concentration of the photoinitiator prepared in Experimental Example 14 was spin-coated on a NaCl window, and the conversion of the styrene vinyl group was measured during photo-curing to obtain an apparent first order photo-curing rate constant ($k_{app}$) according to Mathematical Formula 1. The conversion of the double bond during photo-curing was measured as the intensity ratio of peaks of 1455 and 1632 cm$^{-1}$ on IR spectroscopy spectrum.

$$\ln([M]_0/[M]_t) = k_{app} t$$ [Mathematical Formula 1]

where $[M] = I_{1632}/I_{1455}$, $[M]_0$ is the initial concentration of styrene, $[M]_t$ is the concentration of styrene at time t, and $k_{app}$ is the apparent first order photo-curing constant.

EXPERIMENTAL EXAMPLE 16

Preparation of UV5/TEGDA/Irgacure 184 Photo-curable Composition

UV5 prepared in Experimental Example 2 and TEGDA prepared in Experimental Example 12 were mixed in different ratios as shown in Table 2. The amount of the Irgacure 184 photoinitiator was fixed to about 1.5 wt % and the photoinitiator was completely dissolved in the mixed solutions. The composition solutions were filtered with a 0.2 μm Teflon filter to remove all insoluble minute particles.

TABLE 2

| UV5 wt % | TEGDA wt % | |
|---|---|---|
| 100 | 0 | Example 8-1 |
| 70 | 30 | Example 8-2 |
| 60 | 40 | Example 8-3 |
| 50 | 50 | Example 8-4 |

EXPERIMENTAL EXAMPLE 17

Preparation of UV5/UV33/Irgacure 184 Photo-curable Composition

UV5 prepared in Experimental Example 2 and UV33 prepared in Experimental Example 11 were mixed in different ratios as shown in Table 3. The concentration of the Irgacure 184 photoinitiator was fixed to about 1.5 wt %. Ethyl acetate was introduced into UV5/UV33/Irgacure 184 photo-curable compositions because the solid UV 33 was not completely dissolved in UV5. The total concentration of UV5 and UV33 was always adjusted to 30 wt %. The photoinitiator was completely dissolved in the solutions. The composition solutions were filtered with a 0.2 μm Teflon filter to remove all insoluble minute particles.

TABLE 3

| UV5 wt % | UV33 wt % | |
|---|---|---|
| 100 | 0 | Example 8-1 |
| 70 | 30 | Example 9-1 |
| 50 | 50 | Example 9-2 |
| 30 | 70 | Example 9-3 |

EXPERIMENTAL EXAMPLE 18

Preparation of UV Photo-cured Film

Figure 7:
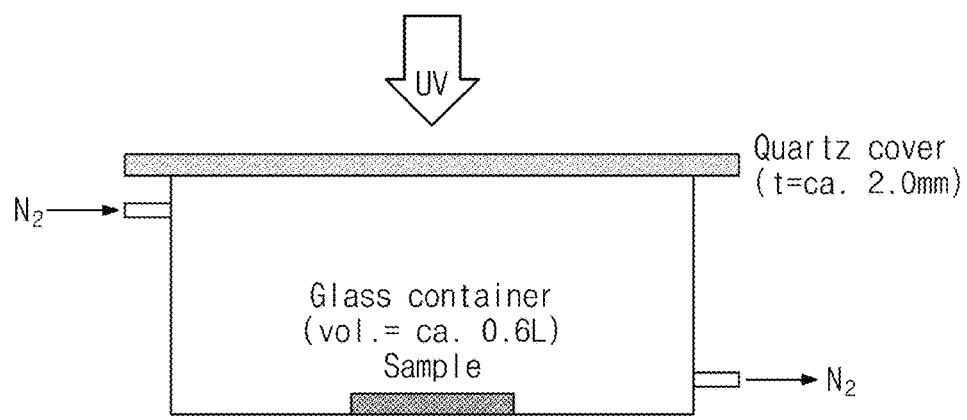
FIG. 7 is a cross-sectional view schematically showing a UV stepper for forming a photo-cured film according to experimental embodiments of the present invention.

FIG. 7 is a cross-sectional view schematically showing a UV stepper for forming a photo-cured film according to experimental embodiments of the present invention.

The photo-curable compositions prepared in Comparative Example 1, Comparative Example 2, Example 3, Example 4, Example 5, Example 6, Example 7, Example 8, and Example 9 were spin-coated on a glass substrate coated with $SiO_2$ at about 3,000 rpm for 30 s (at about 550 rpm for 30 s for Example 1). The solution of Example 2 was spin-coated by changing the spin-coating rate from about 3,000 rpm/30 s to 5,000 rpm/30 s and 5,000 mm/50 s to investigate the effects of the thickness of a layer on the size of a wrinkle structure. In the UV stepper shown in FIG. 7, the photo-curable composition coated on the glass substrate was exposed to UV rays under nitrogen for about 10 min. Particularly, a glass substrate sample coated with the photo-curable composition was placed in a glass container, and nitrogen stream was flowed in a rate of about 10 L/min. A Mercury UVH lamp was used as a UV lamp, and electric power was about 1 kW. UV rays irradiated to the photo-curable composition layers were A-type and B-type as shown in the following Table 4. The A-type irradiation was applied unless otherwise specifically stated.

TABLE 4

| Wavelength | | UVV | UVA | UVB | UVC |
|---|---|---|---|---|---|
| Light intensity ($mW/cm^2$) | A-type | 3.6 | 5.2 | 4.2 | 1.1 |
| | B-type | 8.1 | 11.7 | 9.6 | 2.4 |

UVV: about 395-445 nm; UVA: about 320-390 nm; UVB: about 280-320 nm; UVC: about 250-260 nm

EXPERIMENTAL EXAMPLE 19

Transmittance Spectra of Photo-curable Agent and Photoinitiator

UV-Vis spectroscopy was conducted using PerkinElmer Lambda 750 UV/VIS/NIR Spectrometer. The UV-Vis spectroscopy was conducted using a quartz cell with a thickness of about 1 mm for the photo-curable agent and with a thickness of about 10 mm for the photoinitiator. The measurement was conducted without a solvent for the photo-curable agent and with methanol as a solvent for the photoinitiator. The concentration of the photoinitiator was about $3.36 \times 10^{-4}$ mol % for Irgacure 184 and about $6.51 \times 10^{-5}$ mol % for Darocur TPO.

EXPERIMENTAL EXAMPLE 20

Measurements

IR spectroscopy was conducted using Nicolet 6700 FT-IR spectrometer. Hydrogen and fluorine nuclear magnetic resonance spectroscopy was conducted using Bruker 300 MHz NMR spectrometer. Deuterated chloroform was used as a solvent. Mass spectroscopy was conducted using Jeol JMS-7003 mass spectrometer. Scanning electron micrographic image was obtained using FEI Sirion scanning electron microscope. The intensity of UV rays according to wavelengths was obtained using UV Power Puck II radiometer.

Figure 8:
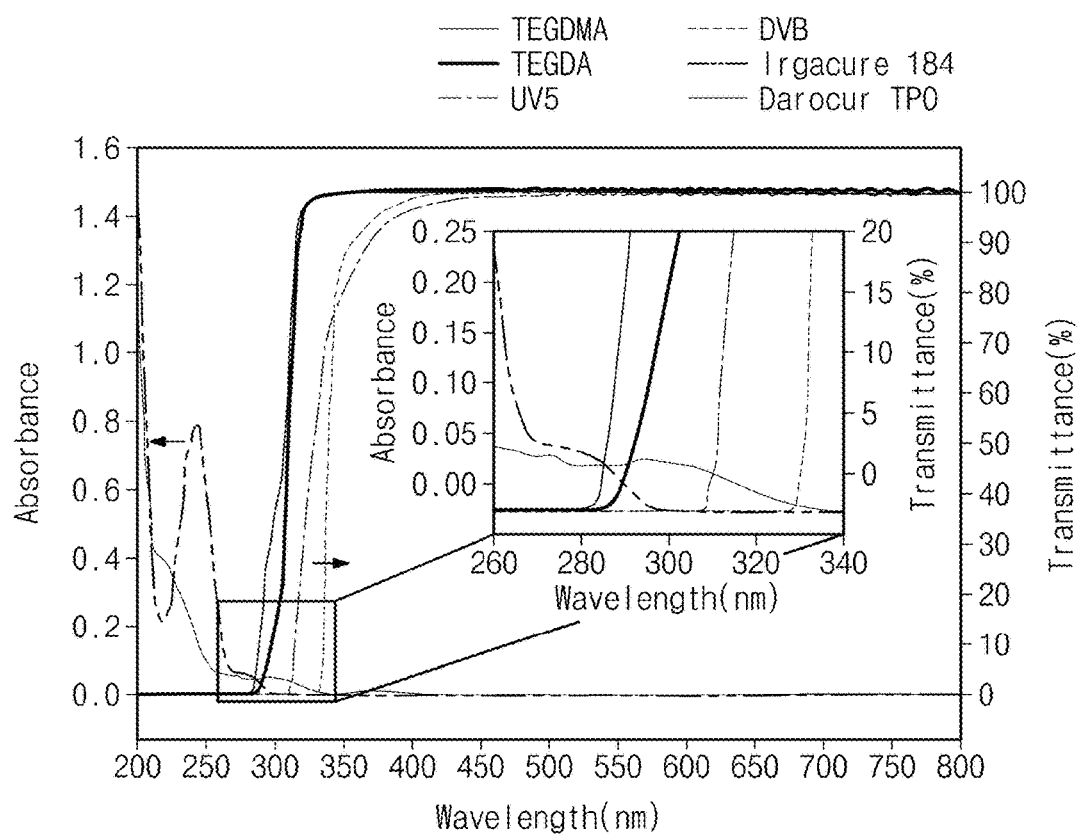
FIG. 8 is a graph comparing the absorbance and the transmittance spectra of various photo initiators and photo-curable agents.

Spectra of the photo-curable agents and the photoinitiators used and prepared in the above Experimental Examples were examined and shown in FIG. 8. FIG. 8 is a graph comparing the absorbance spectrum and the transmittance spectrum of various photo-curable agents and photoinitiators.

Referring to FIG. 8, Irgacure 184 and Darocur TPO as the photoinitiators were compared. In this case, the cut off wavelength of light absorbance of Irgacure 184 was about 300 nm, and the cut off wavelength of light absorbance of Darocur TPO was over about 340 nm. That is, Irgacure 184 may be favorable when compared to Darocur TPO as a photoinitiator for the composition for obtaining a film with a wrinkle structure.

It may be confirmed that the styrene-containing photo-curable agents UV5 and DVB have a cut off wavelength of light transmittance greater than about 300 nm, however the acryl-containing photo-curable agents TEGDMA and TEGDA have a cut off wavelength of light transmittance smaller than about 280 nm. That is, UV5 and DVB are favorable compared to, TEGDMA and TEGDA as a photo-curable agent for the composition for obtaining a film with a wrinkle structure.

The wavelength range of light transmittance of the styrene-containing photo-curable agents UV5 and DVB and the wavelength range of light absorbance of Irgacure 184 are not overlapped. Thus, as described referring to FIGS. 1 and 2A to 2C, a film with a wrinkle structure may be easily formed during UV-curing when Irgacure 184 photoinitiator solution in styrene-containing photo-curable agent was used as a composition (Examples 1-7).

On the contrary, in Irgacure 184 or Darocur TPO solution in acryl-containing photo-curable agents TEGDMA and TEGDA, the wavelength range of light transmittance of the photo-curable agents and the wavelength range of light absorbance of the photoinitiators may be overlapped (for example, Comparative Example 1). Thus, as described referring to FIGS. 4 and 5A to 5C, the formation of a film with a wrinkle structure may be difficult when TEGDMA and TEGDA were exclusively used for the photo-curable agents.

Further, in Darocur TPO solution in styrene-containing photo-curable agents UV5 and DVB or acryl-containing photo-curable agents TEGDMA and TEGDA, the wavelength range of light transmittance of the photo-curable agents and the wavelength range of light absorbance of the photoinitiator may be overlapped (for example, Comparative Example 2). Thus, as explained referring to FIGS. 4 and 5A to 5C, the formation of a film with a wrinkle structure may be difficult when Darocur TPO were exclusively used for the photoinitiator.

Figure 9:
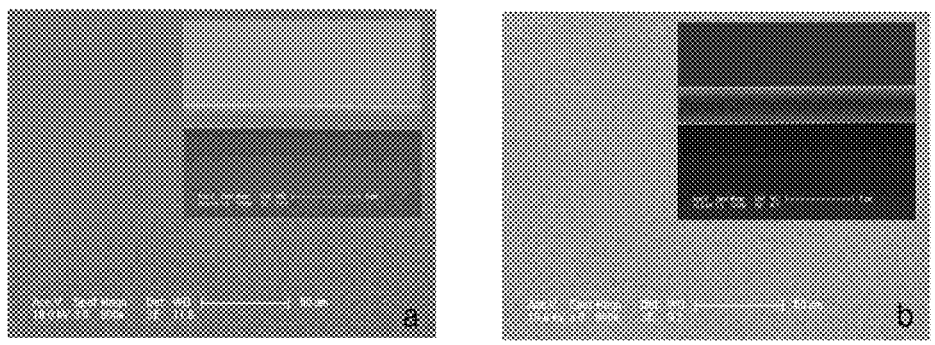
FIG. 9 illustrates plain and cross-sectional scanning electron microscope (SEM) images of photo-cured films prepared from TEGDMA/Irgacure 184 and UV5/Darocur TPO compositions.
Figure 10:
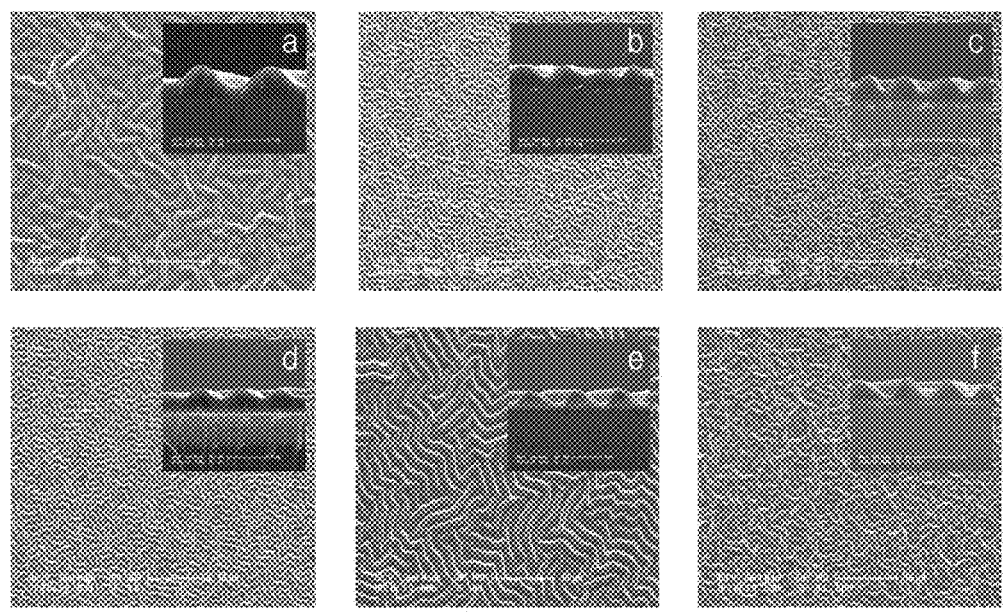
FIG. 10 illustrates plain and cross-sectional SEM images of photo-cured films prepared from the composition including various styrene-containing photo-curable agents and Irgacure 184.

In conclusion, in the case of using the acryl-containing photo-curable agents TEGDMA and TEGDA, the formation of a film with a wrinkle structure may be difficult with any photoinitiators. In the case that the Darocur TPO photoinitiator is used, the formation of a film with a wrinkle structure may be difficult with any photo-curable agents. As shown in FIG. 9, these results may be approved from the plain and cross-sectional SEM images of the photo-cured films prepared from the compositions of Comparative Examples 1 and 2. However, if UV rays under about 270 nm to about 280 nm are irradiated to a composition layer, the wrinkle would be always formed on the film irrespective of photo-curable agents as well as photo initiators. On the contrary, the Irgacure 184 photoinitiator solution in the styrene-containing photo-curable agents UV5 and DVB may be favorable for the formation of a film with a wrinkle structure during UV-curing. As in Experimental Example 13, the formation of the wrinkle structure with respect to diverse compositions of Examples 1-7 prepared using Irgacure 184 as an initiator may be secured through each plain and cross-sectional SEM images in FIG. 10A (Example 1), B (Example 2), C (Example 3), D (Example 4) and E (Example 5), F (Example 6), and FIG. 11 (Example 7). The size of the wrinkle structure may be changed depending on the molecular length of the photo-curable agent. In addition, in the case that at least two styrene moieties are included in a photo-curable agent as photo-curable groups, compositions using the photo-curable agent with diverse structures and Irgacure 184 may produce a film with a wrinkle structure during photo-curing. However, the photo-curable agents UV2 and UV 33 prepared in Experimental Examples 4 and 11 cannot be used for forming a wrinkled film even though they are styrene-containing photo-curable agents. There is no contraction and no wrinkle during UV-curing because UV2 and UV 33 have solid phases.

Figure 11:
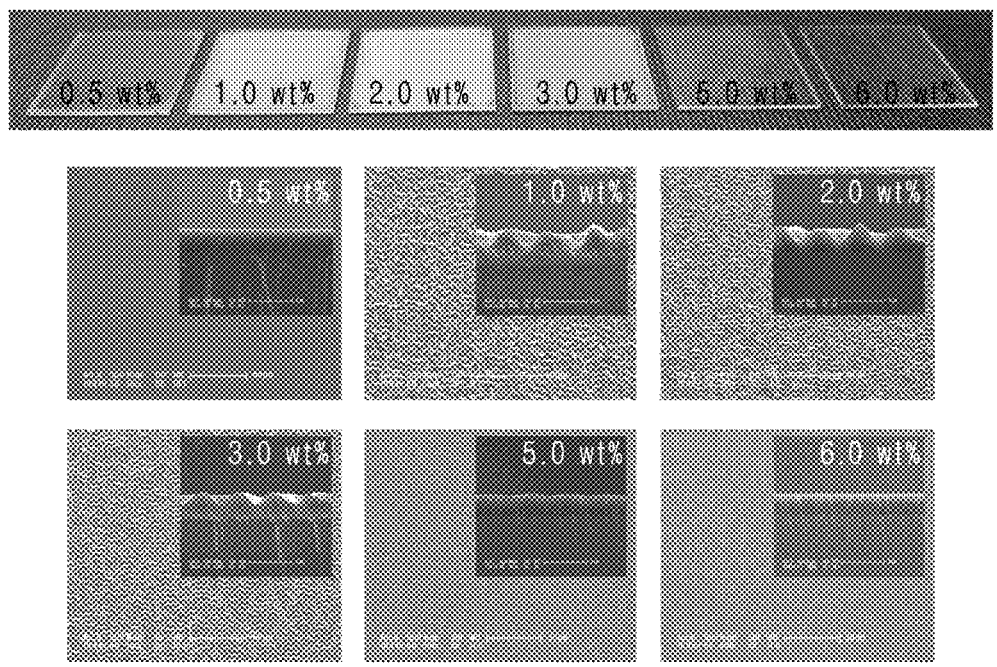
FIG. 11 illustrates plain and cross-sectional SEM images of photo-cured films prepared from a UV5/Irgacure 184 composition with varying the concentration of the photoinitiator.

FIG. 11 illustrates plain and cross-sectional SEM images of photo-cured films formed prepared from the compositions of Examples from 7-1 to 7-6.

Referring to FIG. 11, the formation of films with a wrinkle structure may be secured when using the composition solutions of Example 7-2 (about 1.0 wt %), Example 7-3 (about 2.0 wt %), Example 7-4 (about 3.0 wt %) and Example 7-5 (about 5.0 wt %). That is, in the case that the concentration of the photoinitiator in the composition is varied from about 1.0 wt % to about 5.0 wt %, a film with a wrinkle structure may be formed. It may be secured that in the wrinkle structure of the film thus formed, the wavelength and amplitude of the wrinkle were varied with the concentration of the photoinitiator.

Figure 12:
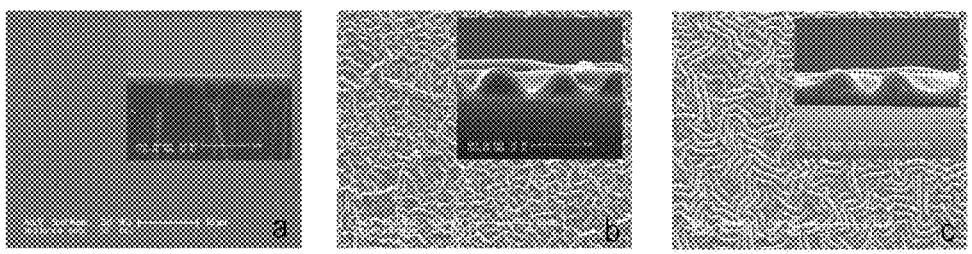
FIG. 12 illustrates plain and cross-sectional SEM images of photo-cured films prepared from a UV5/Irgacure 184 composition at 0.5 wt % of a photoinitiator concentration with increasing light irradiation time period and light intensity.

FIG. 12 illustrates plain and cross-sectional SEM images of photo-cured films prepared from the composition of Example 7-1 with increasing irradiation time and light intensity.

Since the photo-curing reaction rate is proportional to the square root of the concentration of the photoinitiator, and in the case that the concentration of the photoinitiator is lower than about 0.5 wt %, the photo-curing rate is too slow, and a film with a wrinkle structure may not be formed within pre-determined exposure time (FIG. 12A). However, even though the concentration of the photoinitiator is about 0.5 wt %, the photo-curing rate may be increased, and a film with a wrinkle structure may be formed by increasing the irradiation time of UV rays (for example, 20 min, FIG. 12B) and by increasing the light intensity of the UV rays (for example, B-type light intensity in Table 4, FIG. 12C). Since photo-curing reaction rate ($R_p$) is proportional to the concentration of the photoinitiator, the intensity of light, the concentration of a photo-curable group, etc., as shown in the following Mathematical Formula 2, the photoinitiator concentration of the composition for forming the wrinkle structure during photo-curing may be changed.

$$R_p = \frac{K_p}{K_t^{0.5}}[M]\{\Phi I_0(1 - e^{-\varepsilon[I]b})\}^{0.5} \qquad \text{[Mathematical Formula 2]}$$

$$\approx \frac{K_p}{K_t^{0.5}}[M]\Phi I_0(\varepsilon[I]b)^{0.5}$$

$$= K_{app}[M]$$

where $k_p$ and $k_t$ are a propagation rate constant and a termination rate constant, respectively. $\Phi$ is quantum yield for initiation, $I_0$ is incident light intensity, e is an extinction coefficient, [I] is the concentration of an initiator, b is the thickness of a layer, and $k_{app}$ is an apparent first order photo-curing rate constant defined by the following Mathematical Formula 3.

$$K_{app} = \frac{K_p}{K_t^{0.5}}\Phi I_0(\varepsilon[I]b)^{0.5} \qquad \text{[Mathematical Formula 3]}$$

$$K_{app} \propto [I]^{0.5}$$

Figure 13:
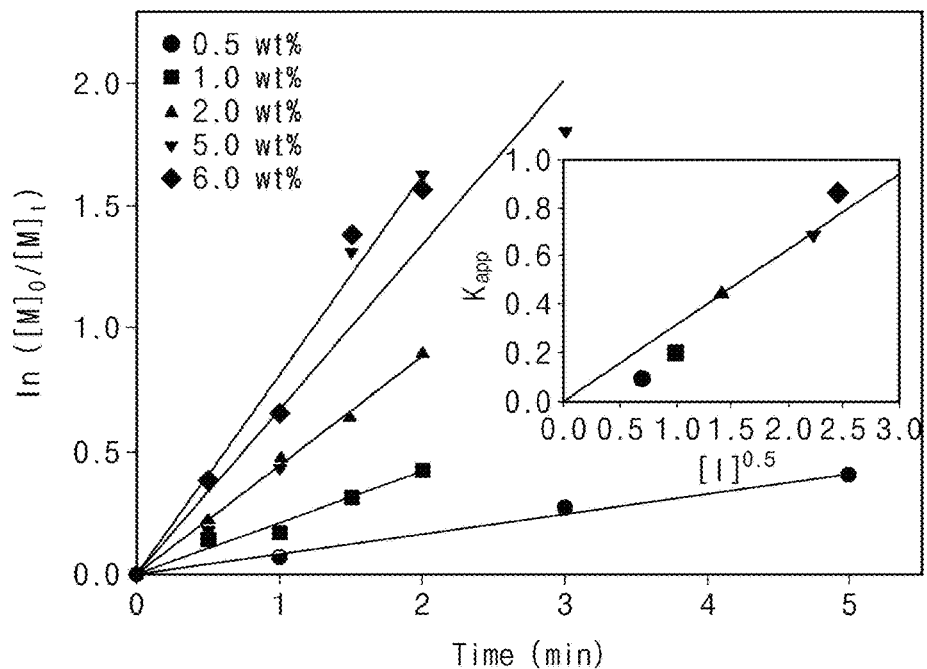
FIG. 13 is a graph illustrating an apparent first order photo-curing rate constant ($k_{app}$) obtained by measuring the evolution rate of a vinyl group with varying a photoinitiator concentration in an UV5/Irgacure 184 composition.

FIG. 13 is a graph illustrating an apparent first order photo-curing rate constant ($k_{app}$) obtained by measuring the consuming rate of a photo-curable group from the compositions of Examples from 7-1 to 7-6. That is, the photo-curing rate constant ($k_{app}$) may be changed from the variation of photoinitiator concentration as shown in FIG. 13.

Referring to FIG. 13, the apparent first order photo-curing rate constant ($k_{app}$) of the composition for forming the wrinkle structure in this embodiment was secured to be in a range from about 0.08 to about 0.86 sec$^{-1}$.

In the case that the concentration of the photoinitiator is over about 5 wt %, the concentration of the styrene group in the photo-curable agent may rapidly decrease during photo-curing and the light transmittance spectrum of the photocured layer may blue-shifted. In this case, the initial photo-cured layer is formed too thick, and a film with a wrinkle structure may not be formed (FIG. 3).

Through this experimental example, it may be secured that the wrinkle structure of a film may be diversely changed by controlling the concentration of a photoinitiator. That is, the wrinkle structure may be changed by controlling a photo-curing reaction rate.

Films with a wrinkle structure were formed using composition solutions of Examples from 8-1 to 8-4 prepared in Experimental Example 16. The plain and cross-sectional SEM images of the films thus formed are shown in FIG. 14.

Figure 14:
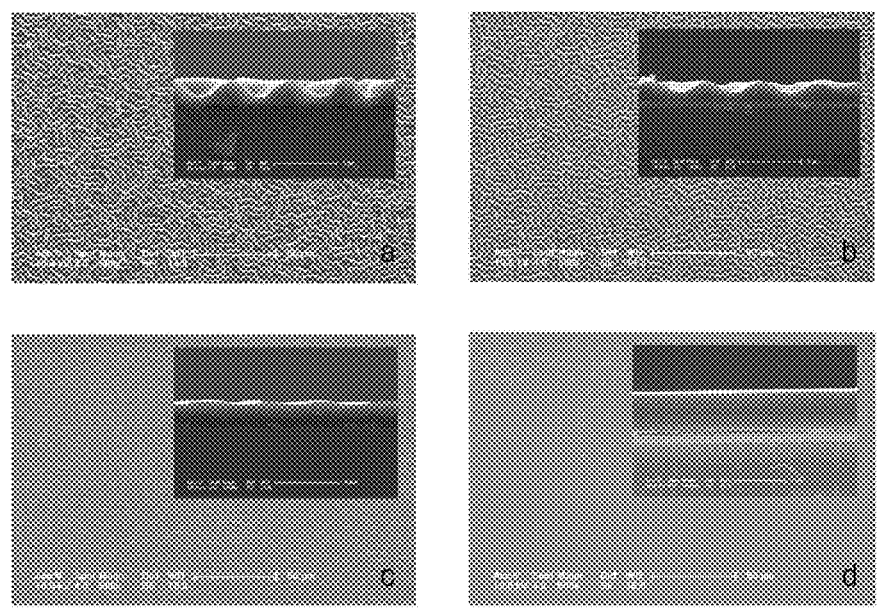
FIG. 14 illustrates plain and cross-sectional SEM images of photo-cured films prepared from a UV5/TEGDA/Irgacure 184 composition with varying the blending ratio of acryl- and styrene-containing photo-curable agents.

FIG. 14 illustrates plain and cross-sectional SEM images of photo-cured films formed according to the variation of the blending ratio of photo-curable agents.

Referring to FIG. 14, photo-cured films were formed using composition solutions of Example 8-1 (UV5:TEGDA=10:0, A), Example 8-2 (UV5:TEGDA=7:3, B), Example 8-3 (UV5:TEGDA=6:4, C) and Example 8-4 (UV5:TEGDA=5:5, D). In this case, the formation of films with a wrinkle structure was secured for Examples 8-1, 8-2 and 8-3. That is, in the case that less than about 50 wt % of an acryl-containing photo-curable agent was blended with a styrene-containing photo-curable agent, the wrinkle structure was formed. In this case, the wrinkle structure of the film thus formed may be secured to have different wavelength and amplitude depending on the concentration of the acryl-containing photo-curable agent. In conclusion, the wrinkle structure may be changed diversely by controlling the blending ratio of the styrene containing photo-curable agent and the acryl-containing photo-curable agent in the composition solution. Similarly, a film with a wrinkle structure could be formed during photo-curing in the case that acryl and styrene moieties were chemically present in a photo-curable agent (Example 6, FIG. 10F).

Figure 15:
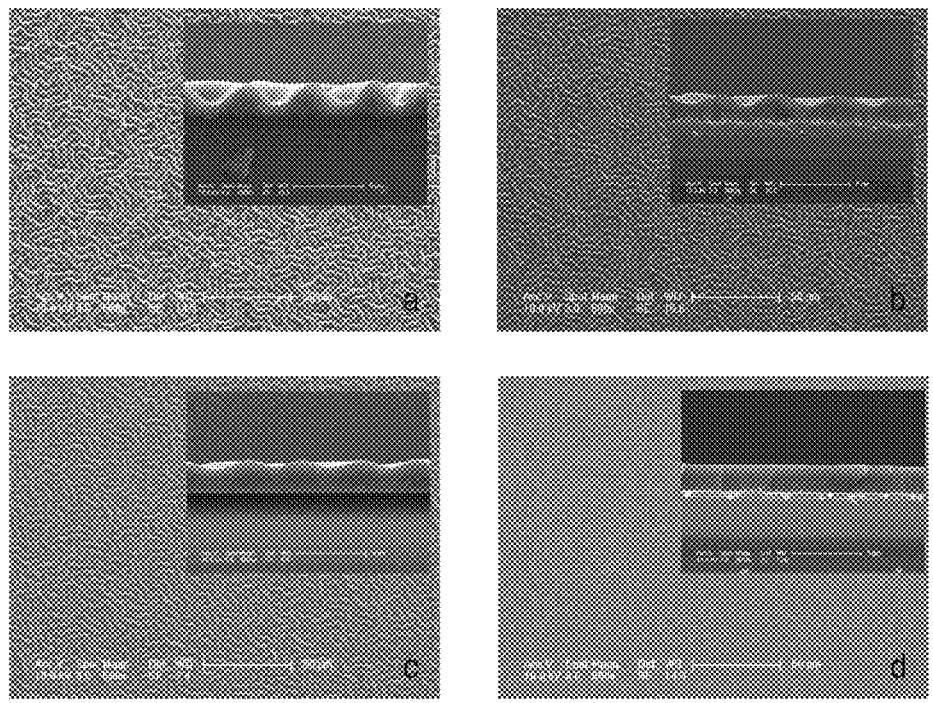
FIG. 15 illustrates plain and cross-sectional SEM images of photo-cured films prepared from a UV5/UV33/Irgacure 184 composition with varying the blending ratio of styrene-containing liquid and solid photo-curable agents.

FIG. 15 illustrates plain and cross-sectional SEM images of photo-cured films formed according to the variation of the blending ratio of a liquid photo-curable agent with the solid photo-curable agent UV33.

Referring to FIG. 15, photo-cured films were formed using composition solutions of Example 8-1 (UV5: UV33=10:0, A), Example 9-1 (UV5:UV33=7:3, B), Example 9-2 (UV5: UV33=5:5, C) and Example 9-3 (UV5: UV33=3:7, D). In this case, the formation of films with a wrinkle structure was secured for Examples 8-1, 9-1, and 9-2. That is, in the case that less than about 70 wt % of a styrene-containing solid photo-curable agent was blended with a styrene-containing liquid photo-curable agent, the wrinkle structure was formed. In this case, the wrinkle structure of the film thus formed may be secured to have different wavelength and amplitude depending on the blending ratio of the styrene-containing solid photo-curable agent. In conclusion, the wrinkle structure may be changed diversely by controlling the blending ratio of the styrene-containing liquid photo-curable agent and the styrene containing solid photo-curable agent in the composition solution.

In addition, it could be known that the size of the wrinkle structure was changed according to the thickness of a layer thus formed even though the same composition was used, as shown in FIG. 16.

FIG. 16 illustrates plain and cross-sectional SEM images of photo-cured films prepared from an UV3/Irgacure 184 composition with varying spin-coating rate (Example 2). Composition layers were obtained from the solution of Example 2 with varying the spin-coating rate from 3,000 rpm/30 s (a) to 5,000 rpm/30 s (b) and 5,000 rpm/50 s (c) as in Experimental Example 18. In this case, the size of the wrinkle structure may decrease as the thickness of composition layer decreases with increasing spin-coating rate or spin-coating time period.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of forming a film, comprising:
    providing a composition comprising a first photo-curable agent, a second photo-curable agent, and a photoinitiator dissolved in a mixed photo-curable agent including the first and second photo-curable agents to form a composition layer on a substrate, the first photo-curable agent having a first cut off wavelength of light transmittance, the second photo-curable agent having a second cut off wavelength of light transmittance that is shorter than the first cut off wavelength of light transmittance;
    controlling a blending ratio of concentrations of the first photo-curable agent and the second photo-curable agent to control a size of a wrinkle structure; and
    curing the composition layer to form a film having a randomly ordered wrinkle structure,
    wherein the photoinitiator has a cut off wavelength of light absorbance less than or equal to about 310 nm, the cut off wavelength of light absorbance being the smallest light wavelength at which a solution layer has a light absorbance of less than or equal to about 0.05, the solution layer having a thickness of about 10 mm and including about $1.0 \times 10^{-4}$ mol % of the photoinitiator.

2. The method for forming a film of claim 1, wherein the curing of the composition layer comprises irradiating ultraviolet rays to the composition layer.

3. The method for forming a film of claim 2, wherein the irradiating of the ultraviolet rays is conducted under an inert gas or under vacuum for from about 1 to about 30 min.

4. The method for forming a film of claim 1, wherein an apparent first order photo-curing rate constant ($k_{app}$) during curing the composition layer is from about 0.08 to about 0.86 min$^{-1}$.

5. The method for forming a film of claim 1, further comprising controlling the thickness of the composition layer to from about 0.1 µm to about 1000 µm to control the size of the wrinkle structure.

6. The method for forming a film of claim 1, wherein the curing of the composition layer comprises irradiating light rays to the composition layer, the light rays having a wavelength range of about 200 nm to about 500 nm.

7. The method for forming a film of claim 1, wherein the first photo-curable agent has a cut off wavelength of light transmittance greater than the cut off wavelength of light absorbance of the photoinitiator.

8. The method for forming a film of claim 7, wherein an apparent first order photo-curing rate constant ($k_{app}$) during curing the composition layer is from about 0.08 to about 0.86 min$^{-1}$.

9. The method for forming a film of claim 7, further comprising controlling the thickness of the composition layer to from about 0.1 µm to about 1000 µm to control the size of the wrinkle structure.

10. The method for forming a film of claim 7, wherein the curing of the composition layer comprises irradiating light rays to the composition layer, the light rays having a wavelength range of about 200 nm to about 500 nm.

11. The method for forming a film of claim 10, wherein the irradiating of the light rays is conducted under an inert gas or under vacuum for from about 1 to about 30 min.

* * * * *